United States Patent
Sato

(10) Patent No.: US 8,416,669 B2
(45) Date of Patent: Apr. 9, 2013

(54) GENERATION METHOD FOR COMPLEX AMPLITUDE IN-LINE HOLOGRAM AND IMAGE RECORDING DEVICE USING SAID METHOD

(75) Inventor: Kunihiro Sato, Himeji (JP)

(73) Assignee: Hyogo Prefectural Government, Kobe-shi (JP)

( * ) Notice: Subject to any disclaimer, the term of this patent is extended or adjusted under 35 U.S.C. 154(b) by 0 days.

(21) Appl. No.: 13/574,565

(22) PCT Filed: Dec. 22, 2010

(86) PCT No.: PCT/JP2010/073185
§ 371 (c)(1),
(2), (4) Date: Jul. 20, 2012

(87) PCT Pub. No.: WO2011/089820
PCT Pub. Date: Jul. 28, 2011

(65) Prior Publication Data
US 2012/0294136 A1    Nov. 22, 2012

(30) Foreign Application Priority Data
Jan. 22, 2010 (JP) .................................. 2010-012425

(51) Int. Cl.
*G11B 7/00* (2006.01)
(52) U.S. Cl. .................................... 369/103; 369/112.15
(58) Field of Classification Search .................. None
See application file for complete search history.

(56) References Cited

U.S. PATENT DOCUMENTS

| | | | |
|---|---|---|---|
| 6,246,495 B1 | 6/2001 | Yamaguchi | |
| 6,262,818 B1 | 7/2001 | Cuche et al. | |
| 7,068,375 B2 * | 6/2006 | Voelkl | 356/489 |
| 7,099,057 B2 * | 8/2006 | Parker et al. | 359/15 |
| 2007/0103757 A1 | 5/2007 | Kubara et al. | |

FOREIGN PATENT DOCUMENTS

| | | |
|---|---|---|
| JP | 2002-526815 A | 8/2002 |
| JP | 2002-526815 A5 | 8/2002 |
| JP | 3471556 B2 | 12/2003 |
| JP | 2005-283683 A | 10/2005 |
| JP | 2007-114463 A | 5/2007 |
| JP | 2008-122565 A | 5/2008 |

OTHER PUBLICATIONS

International Search Report dated Feb. 8, 2011 including English-language translation (Two (2) pages).

* cited by examiner

*Primary Examiner* — Muhammad N Edun
(74) *Attorney, Agent, or Firm* — Crowell & Moring LLP

(57) ABSTRACT

A method for generating a complex amplitude in-line hologram and an image recording device using said method makes it possible to realize high-speed processing and high-speed recording from a single off-axis hologram without limiting the spatial frequency band and without creating errors from interpolation. The complex amplitude in-line hologram is generated by performing the following in order: the acquisition of data for one off-axis hologram obtained by way of off-axis holography, and for an off-axis reference light used for obtaining the hologram; the setting of a reconstruction in-line reference light; a modulation process for performing spatial heterodyne modulation on the hologram on the basis of the phases of the reference lights; and a filtering process for performing spatial frequency filtering on the hologram modulated by the modulation process. Because spatial sampling is not performed, the limits on the viewing angle are relaxed.

18 Claims, 17 Drawing Sheets

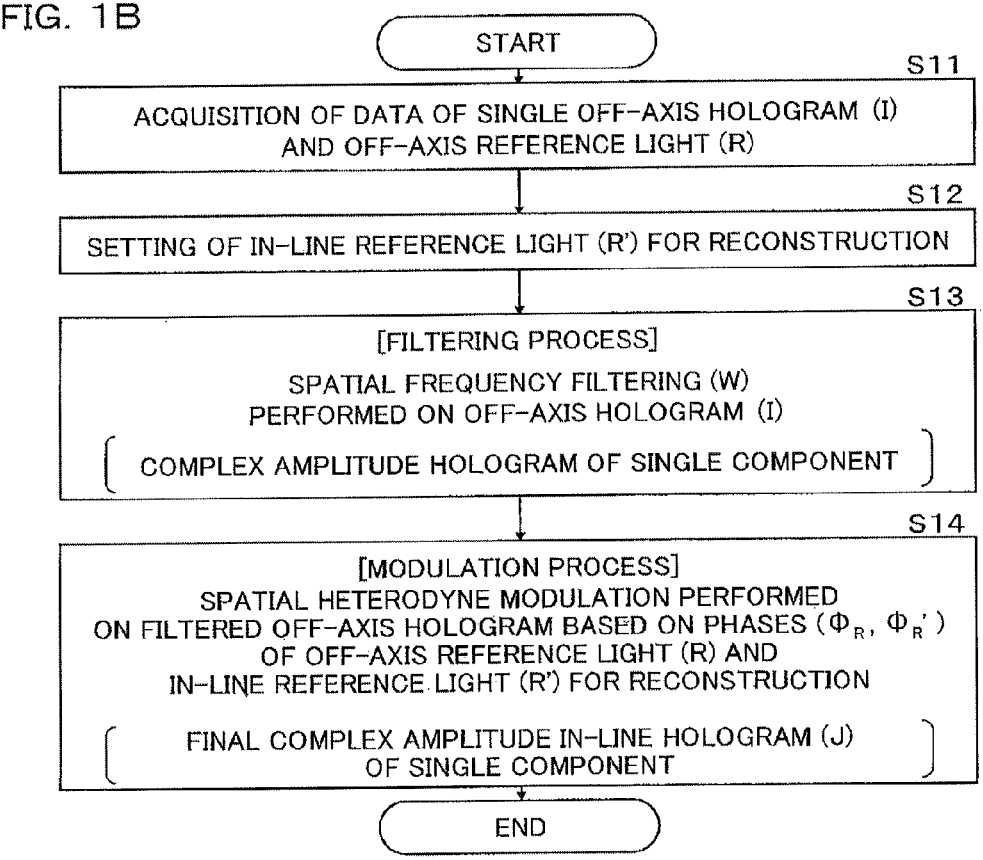

SPATIAL HETERODYNE MODULATION

SPATIAL FREQUENCY FILTERING

OFF-AXIS
HOLOGRAM (I)

REAL PART
OF COMPLEX
AMPLITUDE
HOLOGRAM (J)

IMAGINARY PART
OF COMPLEX
AMPLITUDE
HOLOGRAM (J)

$O_0 R_0 \exp[i(\phi_0 - \phi_R')]$ w $f_s \ (=1/d)$

GENERATION METHOD FOR COMPLEX AMPLITUDE IN-LINE HOLOGRAM AND IMAGE RECORDING DEVICE USING SAID METHOD

TECHNICAL FIELD

The present invention relates to a method for generating a complex amplitude in-line hologram from an off-axis digital hologram and an image recording device using the same method.

BACKGROUND ART

Holography is technology for recording an interference pattern on a light receiving surface of a photographic plate by receiving on this plate both an object light generated by illuminating a model object with an illuminating light and a reference light coming from another pathway, in which the illuminating light and the reference light are mutually coherent and are prepared by splitting a laser light. A hologram is a photographic plate after development. A three-dimensional object image (virtual image) can be reconstructed and seen in a position where there was the object by irradiating the hologram with a light for reconstruction. Computer holography is technology for calculating data of an interference pattern on an arbitrary plane defined as a hologram plane, on which an object is expressed by data inside a computer, and physical simulations of reflection, diffraction, and interference of light are made within the computer. A hologram is realized using a certain display device based on the calculation result. Since an object is defined with data on a computer, no model object is necessary and optical compensation is possible. Moreover, object images can be reconstructed continuously by realizing a hologram by displaying the interference pattern recorded on a memory on a reflective type LCD etc. one after another and by irradiating the hologram with a reference light.

Digital holography is technology for generating a hologram by sensing and recording an interference pattern with a CCD image sensor, a CMOS image sensor, etc. electronically instead of with a photographic plate, and processing a light intensity distribution of the recorded interference pattern numerically to compute an object light wave. If digital holography is used, the wave front data of an object light can be obtained in a form of a two-dimensional complex amplitude distribution on an image sensor surface. Object images in various viewpoints and positions are obtained based on wave front data like above-mentioned computer holography. By the way, in a three-dimensional image pickup by holography, generally, a reference light and an object light themselves and also optically mixed interference fringes, which are made by mutual mixture of object lights scattered on a object surface, and mutual mixture of reference lights generated by scattering on a light pathway, and so on, are recorded in addition to optically modulated interference fringes made by modulating the reference light with the object light. Among these, the requisites for image reconstruction are the optically modulated interference fringes, and other light components have an adverse effect on image reconstruction and reduce image quality of a reconstructed image. In order to acquire only the optically modulated interference fringes and to record them as object light wave front data, it is necessary to acquire above-mentioned complex amplitude distribution. The hologram using the conventional photographic plate etc. is of only real part data, because it fixes and records phase information of object light with a method so called interference instead of recording momentary phase of a light wave (object light wave front information). Complex amplitude consists of plural data called amplitude and phase, or real part and imaginary part. Therefore, in order to obtain complex amplitude, a plurality of hologram data are required. Phase shift digital holography is known as technology for acquiring only the optically modulated interference fringes (for example, refer to patent document 1).

In the phase shift digital holography, phase state of a reference light to an object light is shifted in three steps or four steps, and a plurality of mutually different hologram data are acquired. There are several methods to shift the phase of the reference light such as a method of inserting a thin glass plate in a propagation path of the reference light and a method of moving a position of a mirror which reflects the reference light using a piezoelectric element. For example, using the piezoelectric element, three kinds of hologram data are acquired in the state where the phase of the reference light is shifted every $\pi/2$, and complex amplitude of the object light is obtained from simultaneous equations between each picture element data of three holograms. However, in an image recording using this method, since an amount of shift of control parameter for a phase shift generally has wavelength dependency, there is a fault of difficulty in color hologram acquisition. A phase shift method using a spatial light modulation element is proposed as a way to shift simultaneously only the same value for phases of 3-color reference lights of red, blue, and green by annihilating the wavelength dependency (for example, refer to patent document 2).

However, although the phase shift digital holography using the spatial light modulation element is excellent as image pick-up technology of a still three-dimensional image, it is necessary to shift the phase states of reference light and to record a plurality of holograms one by one to obtain single complex amplitude hologram. That is, this recording is in principle done in time transition, unless simultaneous recording is done for several holograms of different phase states. Accordingly, there is a limit to applying this technology to pick-up of three-dimensional image of a photographic subject which changes temporally or a photographic subject which moves. Then, there is a method for acquiring data of a plurality of holograms simultaneously by changing phase states of reference light for every picture element of a light receiving surface. For example, a phase distribution in a cross section of the reference light is given by inserting, in the propagation path of the reference light, a phase shift array device which has elements arranged in an array so that adjacent one is of different phase mutually by $\pi/2$, and information of an interference pattern, in which phase of the reference light is changed in four steps; 0, $\pi/2$, $\pi$, and $3\pi/2$, is recorded in a single hologram. In this case, every one fourth of the picture element data in the single hologram forms four kinds of holograms, respectively (for example, refer to patent document 3).

The method of using the phase shift array device needs to coincide strictly each picture element position of an optical deflection array device, the phase shift array device, and a photo detecting device, and therefore high alignment accuracy is required for the devices. Moreover, there is an issue such as error correction when a picture element position shifts due to disturbance. Moreover, it seems to be difficult to make such a phase shift array device with a high degree of accuracy at low-cost. Furthermore, since the phase shift of light has wavelength dependency, it is thought that colorization of a recorded image is difficult. Then, a method for realizing high-speed acquisition of a phase shift hologram by an easy composition is proposed, which changes phase states of the reference light on a light receiving surface for every picture element only using a geometric arranging relation of the parallel reference light and the light receiving surface (for example, refer to patent document 4).

The method shown in the above-mentioned patent document 4 enables single shot record of a color three-dimensional image by inclined irradiation of the parallel reference light, and post processing of hologram data. This method, by irradiating a photo detector such as CCD with the inclined parallel reference light, makes the phase of reference light distribute periodically on the photo detector surface, and records an object light wave front by a single shot as an off-axis hologram. Then, three or four interference fringe holograms each having different phase state of the reference light are derived by data processing such as a spatial sampling of recorded hologram data and a data interpolation. By using the derived plurality of interference fringe holograms, a complex amplitude in-line hologram which records only object light wave front after elimination of a noise component is generated. Since this complex amplitude in-line hologram is obtained based on a single hologram of a single shot record without time transition in this method, real-time image pickup of three-dimensional image in motion is in principle attainable by improvement of processing speed and use of pulsed laser.

PRIOR ART DOCUMENT

Patent Document(s)

Patent document 1: Japanese Patent No. 3471556
Patent document 2: JP2007-114463A
Patent document 3: JP2005-283683A
Patent document 4: JP2008-122565A

DISCLOSURE OF THE INVENTION

However, because a spatial sampling and a data interpolation are used for the generation method of the complex amplitude in-line hologram shown in the patent document 4 mentioned above, it has following problems. A spatial sampling restricts spatial frequency band of a hologram, and therefore a viewing angle of a recordable three-dimensional image becomes narrow. For example, in development of imaging device aiming at realization of a three-dimensional display, it has been a problem to obtain a three-dimensional image with large viewing angle. In order to solve this problem, it is necessary to give a wide spatial frequency band to a complex amplitude in-line hologram. Moreover, the data interpolation has a problem of producing errors in the generated complex amplitude hologram.

The present invention is to solve the above problems, and an object of the present invention is to provide a generation method for generating a complex amplitude in-line hologram from an off-axis digital hologram and an image recording device using the same method which can realize high speed processing and high speed recording, by easy constitution, without restricting a spatial frequency band, and without producing errors caused by interpolation.

A generation method for generating a complex amplitude in-line hologram according to an embodiment of the present invention, comprises the steps of: performing spatial heterodyne modulation on an off-axis hologram obtained by off-axis holography, based on phase of an in-line reference light for reconstruction and phase of an off-axis reference light used for obtaining the off-axis hologram; and performing spatial frequency filtering on the hologram modulated by the spatial heterodyne modulation. The method generates the complex amplitude in-line hologram by performing the spatial heterodyne modulation and the spatial frequency filtering in order.

A generation method for generating a complex amplitude in-line hologram from an off-axis hologram according to another embodiment of the present invention, comprises the steps of: performing spatial frequency filtering on an off-axis hologram obtained by off-axis holography; and performing spatial heterodyne modulation on the hologram filtered by the spatial frequency filtering, based on phase of an in-line reference light for reconstruction and phase of an off-axis reference light used for obtaining the off-axis hologram. The method generates the complex amplitude in-line hologram by performing the spatial frequency filtering and the spatial heterodyne modulation in order.

According to such constitution, since a complex amplitude in-line hologram can be generated from single off-axis hologram by the spatial heterodyne modulation and the spatial frequency filtering without performing a spatial sampling and a data interpolation, the complex amplitude in-line hologram can be generated without restricting a spatial frequency band and thus without restricting a viewing angle, and also without errors to be caused by interpolation. Therefore, the spatial frequency band of the generated hologram can be extended to the recordable limit defined by the picture element pitch of a photo detector, and a three-dimensional image of wide viewing angle can be recorded. Moreover, existing data processing technology can be used for the spatial heterodyne modulation and the spatial frequency filtering, and constitution is simple and high speed processing is possible. Since single monochromatic off-axis hologram is enough to generate single monochromatic complex amplitude in-line hologram and a required off-axis hologram is easily obtained, images can be recorded in real time. Moreover, a reference light used for obtaining the off-axis hologram is not restricted to a parallel beam, but more general reference light, for example, a spherical wave etc., can be used for it. The phase of the reference light is enough if its phase distribution is known, and an arbitrary space phase distribution is acceptable.

An image recording device according to an embodiment of the present invention for generating a complex amplitude in-line hologram from an off-axis hologram which records an object image so as to record the hologram electronically as object image information comprises: an off-axis hologram obtaining unit for recording the object image as the off-axis hologram by off-axis holography; a hologram converter for generating the complex amplitude in-line hologram from the off-axis hologram obtained by the off-axis hologram obtaining unit; and a storage unit for electronically recording the complex amplitude in-line hologram generated by the hologram converter as object image information. The hologram converter includes: a modulation unit for performing spatial heterodyne modulation on the off-axis hologram, based on phase of an in-line reference light for reconstruction and phase of an off-axis reference light used for obtaining the off-axis hologram; and a filtering unit for performing spatial frequency filtering on the hologram modulated by the modulation unit. The image recording device generates the complex amplitude in-line hologram using the modulation unit and the filtering unit.

An image recording device according to another embodiment of the present invention is the one that, instead of the above mentioned modulation unit and the filtering unit in the above mentioned image recording device, the hologram converter comprises: a filtering unit for performing spatial frequency filtering on the off-axis hologram; and a modulation unit for performing spatial heterodyne modulation on the hologram filtered by the filtering unit, based on phase of an in-line reference light for reconstruction and phase of an off-axis reference light used for obtaining the off-axis hologram. The image recording device generates the complex amplitude in-line hologram using the modulation unit and the filtering unit.

According to such constitution, high-speed continuous acquisition of a single off-axis hologram is easy, and since generation of a complex amplitude in-line hologram can be performed by post processing, a time series images of the changing object or moving object can be easily recorded. If a complex amplitude in-line hologram is generated at high speed, it is possible to generate, record, and distribute the complex amplitude in-line hologram for moving image in real time.

BRIEF DESCRIPTION OF THE DRAWINGS

FIG. 1B is a flow chart explaining a modification of the method.

MODE FOR CARRYING OUT THE INVENTION

Hereafter, a generation method for generating a complex amplitude in-line hologram and an image recording device using the same method according to embodiments of the present invention are described with reference to drawings. For your information, each technical term is accordingly or occasionally used in simplified or abbreviated expression.

First Embodiment

FIGS. 1 to 9 show the generation method for generating a complex amplitude in-line hologram according to the first embodiment. The generation method, as shown in FIGS. 1A and 2A, generates a complex amplitude in-line hologram J by performing following steps in order: acquiring data of one off-axis hologram I obtained by off-axis holography and data of an off-axis reference light R used to obtain the hologram I (S1), setting an in-line reference light R' for reconstruction (S2), performing spatial heterodyne modulation on the hologram I based on phases of the reference light R and R' i.e. modulation process (S3), and performing spatial frequency filtering on the hologram modulated by the modulation process i.e. filtering process (S4). Hereafter, detailed explanation of each process is carried out, referring to other figures. As shown in FIGS. 1B and 2B, the order of the modulation process (S3) and the filtering process (S4) may be reversed, and this is explained later.

Figure 3:
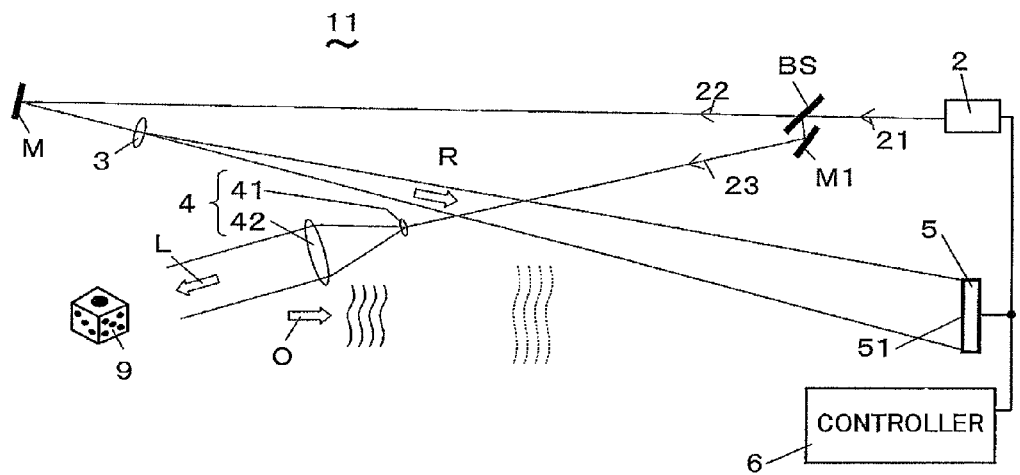
FIG. 3 is a plan view of a device for obtaining an off-axis hologram which is a processing object of the method.

The data of the hologram I in the step (S1) and the reference light R are data acquired by an off-axis hologram obtaining apparatus 11 shown in FIG. 3, for example. The hologram obtaining apparatus 11 comprises a laser 2 which is a monochromatic coherent light source, a beam splitter BS which divides a laser beam 21 from the laser 2 into a reference light 22 and an illumination light 23 and emits them, a mirror M which reflects the reference light 22, a lens system 3 which makes the reference light 22 reflected by the mirror M into a reference light R expanded in a shape of a spherical wave, a mirror M1 which reflects the illumination light 23, a lens system 4 which makes the illumination light 23 reflected by the mirror M1 into an illumination light L expanded and formed in a parallel beam, a photo detector 5 which receives the reference light R and an object light O emitted from an object 9 illuminated by the illumination light L, and a controller 6 which controls the laser 2 and the photo detector 5. The lens system 4 is composed of a lens 41 which expands the illumination light 23 and a collimating lens 41 (SIC) which makes the expanded light into a parallel beam, for example. The object 9 which is a photographic subject is arranged on an image pick-up axis of the central front direction of a light receiving surface 51 of the photo detector 5. The reference light R is emitted in a direction leaning to the image pick-up axis i.e. from an off-axis direction towards the center of the light receiving surface 51. A monochromatic off-axis hologram is obtained electronically by this hologram obtaining apparatus 11. It is necessary and enough for this generation method to get only one hologram among several off-axis holograms of mutually different phase states which are acquired in what is called phase shift digital holography. Therefore, such a hologram acquisition apparatus 11 is constituted easily. The data of the reference light R can be obtained easily through an actual measurement by irradiating the light receiving surface 51 with a parallel beam for measurement together with the reference light R and recording interference fringes, or through calculation based on the optical arrangement of each light element and other optical conditions in the hologram obtaining apparatus 11, for example.

Figure 4:
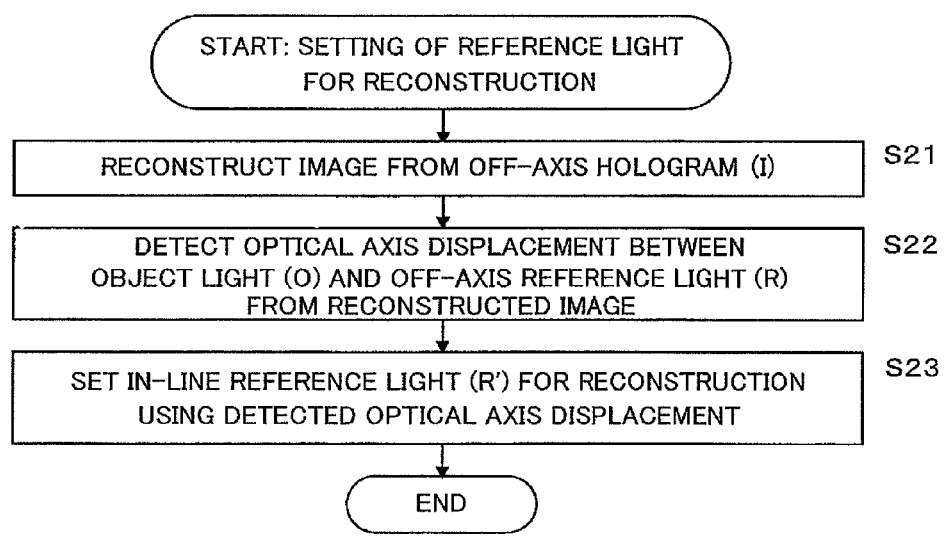
FIG. 4 is a flow chart explaining processing of setting a reference light for reconstruction in the method.

The in-line reference light R' for reconstruction in a step (S2) is of a wave length $\lambda$ which is same as the wave length $\lambda$ of the reference light R, and its optical axis is usually set in a central front direction of the light receiving surface 51. Moreover, the optical axis of the reference light R' may also be set in a direction in which the intensity of the object light O from the object 9 is at maximum. In this case, as shown in FIG. 4, an image is reconstructed from the hologram I (S21), and a displacement between optical axes of the object light O and the off-axis reference light R is detected using the reconstructed image (S22), and the optical axis of the reference light R' is determined using the detected optical axis displacement (S23). Thereby, the optical axis of the in-line reference light for reconstruction can be set more appropriately and certainly. The phase of the reference light R' can be set arbitrarily suitably.

Figure 5:
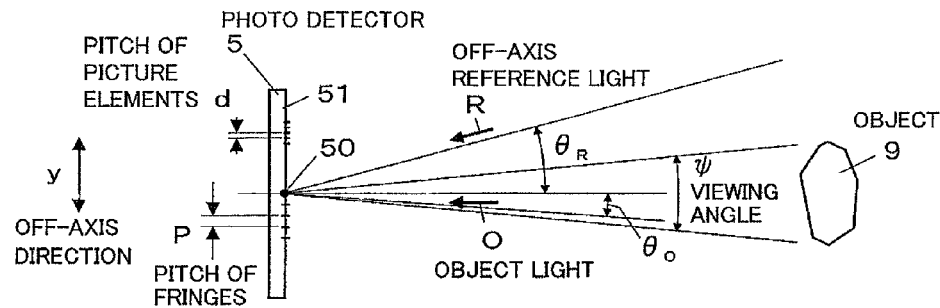
FIG. 5 is a plan view explaining a relation of a spatial frequency and a viewing angle in the method.
Figure 6:
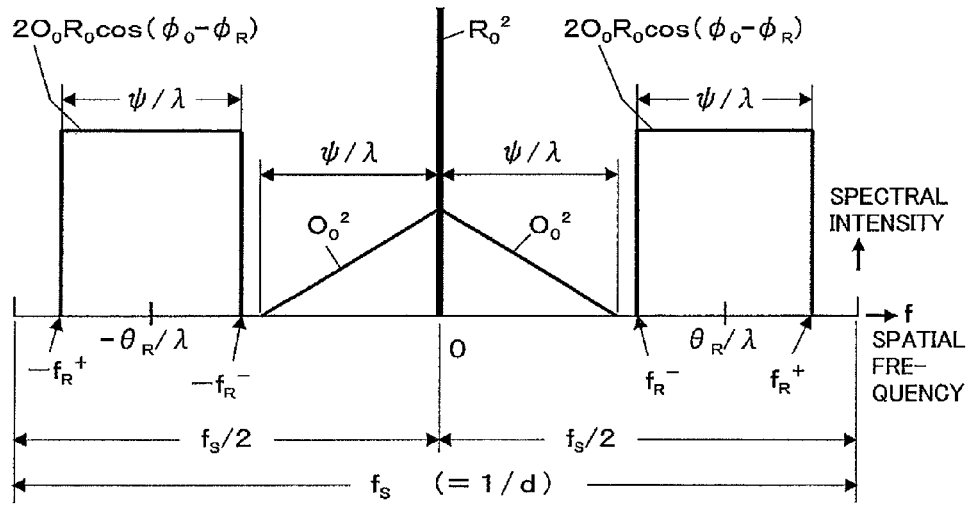
FIG. 6 is a figure explaining a spatial frequency distribution of an off-axis hologram in the method.

Here, with reference to FIGS. 5, 6, and 7, concepts of spatial frequency, viewing angle, and spatial frequency distribution of the off-axis hologram I, and these mutual relation are explained. As shown in FIG. 5, it is supposed that the object 9 is in front of the center of the photo detector 5, and paying attention to the center point 50 of the light receiving surface 51, an angle viewing the object 9 from the center point 50 is set as the viewing angle $\psi$, and an incident angle of a certain object light O coming into the center point 50 and an incident angle of the reference light R coming into the center point 50 are defined as $\theta_O$ and $\theta_R$, respectively. The upper-and-lower (top-bottom) direction of the figure is defined as an off-axis direction y, and $\theta_R$ is an off-axis angle (axis-shift angle). Here, the reference light R may be a spherical wave or a plane wave and not restricted to these and arbitrary. Moreover, the photo detector 5 is, for example, a CCD image sensor, and is assumed that each optical sensing part, which becomes a picture element, in the CCD image sensor constitutes the light receiving surface 51 arranged as a two-dimensional array in the off-axis direction y and its orthogonal direction. Each picture element is arranged by picture element pitch d. The object light O and the reference light R form an interference fringe pattern on the light receiving surface 51, and the pitch of the fringes is denoted by P. The object 9 is supposed, for simplicity, to be a white plate parallel to the light receiving surface 51.

In the constitution of FIG. 5, generally, the widest spatial frequency band width of the hologram I recordable using the photo detector 5 becomes a spatial sampling frequency $f_S$ which is determined from the picture element pitch d of the photo detector 5. Where, the spatial sampling frequency $f_S$ is calculated as follows: $f_S=1/d$. That is, the widest spatial frequency band width is restricted by the picture element pitch d. The pitch P of the fringes is $P=\lambda/(\sin\theta_R+\sin\theta_O)$, and in the paraxial case, becomes $P=\lambda/(\theta_R+\theta_O)$. Moreover, on a center axis, i.e. in the case $\theta_O=0$, following notations are defined; P (on center axis)$=\lambda/\theta_R=1/f_R$, $P^+=1/f_R^+=\lambda/(\theta_R+\psi/2)$, $P^-=1/f_R^-=\lambda/(\theta_R-\psi/2)$, $f_R^+=1/P^+=\theta_R/\lambda+\psi/(2\lambda)$, $f_R^-=1/P^-=\theta_R/\lambda-\psi/(2\lambda)$.

Each meaning of the above-mentioned notations is shown in the spatial frequency distribution figure of FIG. 6. This spatial frequency distribution is a one-dimensional spatial frequency distribution of an off-axis hologram I in the off-axis direction y when a photographic subject of uniform brightness (for example, object 9 consisting of a white plate) is recorded. Each of $R_0^2$, $O_0^2$, $2O_0R_0\cos(\phi_O-\phi_R)$ in the figure is a component of light intensity I (intensity of the off-axis hologram I) on the light receiving surface 51, and each of them is light intensity of the reference light R, light intensity of the object light O, and light intensity of the optical modulation interference fringe pattern caused by interference between the reference light and the object light (refer to the after-mentioned equations (1), (2), (3)). In this distribution figure, the spread widths of the light intensity of the object light O and the light intensity of the optical modulation interference pattern are defined using the viewing angle w and the wave length $\lambda$, i.e. $\psi/\lambda$. Moreover, the center of the spread of the light intensity of the optical modulation interference fringe pattern is defined using the angle $\theta_R$ and the wave length $\lambda$, i.e. $\theta_R/\lambda$.

Figure 7A:
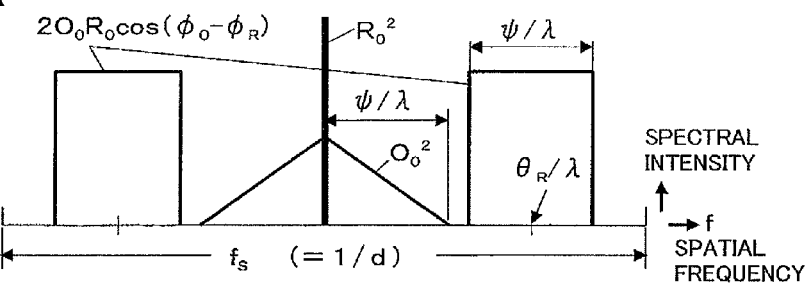
FIG. 7A is a spatial frequency distribution figure when a viewing angle is narrow and an off-axis angle of a reference light is suitable.
Figure 7B:
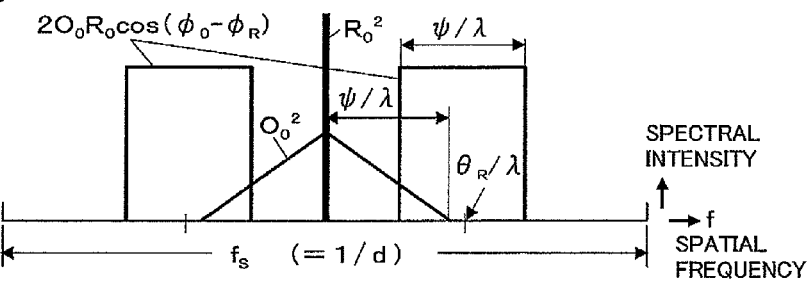
FIG. 7B is a spatial frequency distribution figure when an off-axis angle is too small.
Figure 7C:
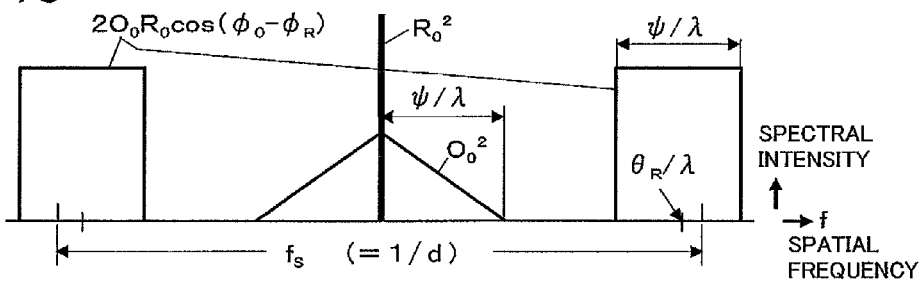
FIG. 7C is a spatial frequency distribution figure when an off-axis angle is too large.

Therefore, depending on the numerical values of the above-mentioned $\psi$, $\theta_R$, and $\lambda$, etc., the light intensity distribution of the object light O and the light intensity distribution of the optical modulation interference fringe pattern overlap mutually or separate each other, or go beyond the range of spatial sampling frequency $f_S$. For example, when the viewing angle $\psi$ is narrow (small), FIG. 7A shows the case of no overlap in distribution, FIG. 7B shows the case of an overlap, and FIG. 7C shows the case there is no overlap but go beyond the range of the spatial sampling frequency $f_S$. It can be seen that the condition for the limit of no overlapping is $\psi/\lambda=f_S/4$, that is, the limit to which the viewing angle $\psi$ can be expanded (enlarged) without overlapping is $\psi=\lambda f_S/4=\lambda/(4d)$. This condition is a condition for the off-axis direction y, and the axis-shift angle $\theta_R$ is $\theta_R/\lambda=(\psi/\lambda)\cdot(3/2)$ i.e. a case where it is adjusted to $\theta_R=3\psi/2=3\lambda/(8d)$. This embodiment generates a complex amplitude in-line hologram from one off-axis hologram I, when the light intensity distribution does not overlap as shown in FIGS. 6 and 7A.

Figure 8A:
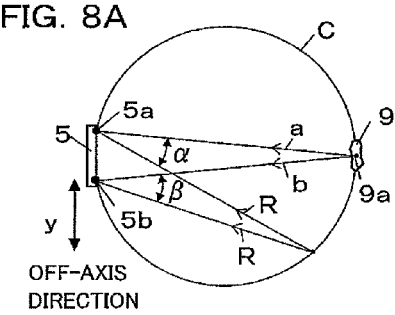
FIG. 8A is a plan view showing conditions for obtaining an off-axis hologram by the method using a reference light of spherical wave.
Figure 8B:
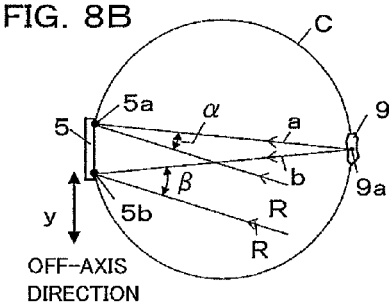
FIG. 8B is a plan view in case a reference light is a parallel light.

FIGS. 8A and 8B show the difference between a case where the reference wave R is a spherical wave and a case where that is a parallel wave. FIG. 8A shows especially the case that the reference wave R is a spherical wave, and its light source, the object 9, and the light receiving surface 51 of the photo detector 5 are on the same circumference C. In this case, the angles $\alpha$ and $\beta$, each of which is made by viewing a point 9a of the object 9 and a point at the light source of the reference light R from a point on the light receiving surface 51, are equal ($\alpha = \beta$) for the points 5a and 5b at the both ends of the light receiving surface 51, and also approximately they become equal for any of points on the light receiving surface 51. However, as shown in FIG. 8B, when the reference light R is a parallel beam, such conditions are not realized and $\alpha \neq \beta$. Therefore, compared with the case of parallel reference light, recording of a hologram of wide viewing angle is attained with a larger light receiving surface by using the spherical wave emitted from a point source as the reference light R.

Figure 9A:
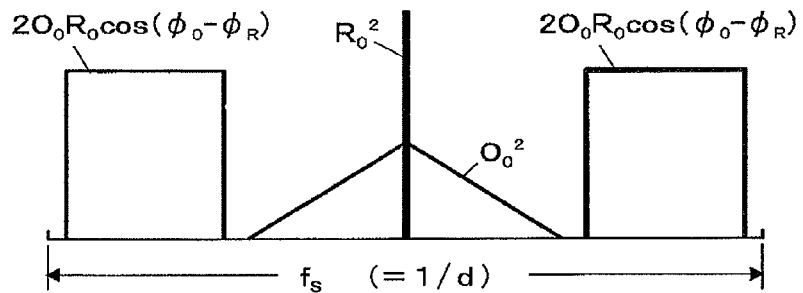
FIG. 9A is a spatial frequency distribution figure of an off-axis hologram to which the method is applied when a viewing angle is narrow.
Figure 9B:
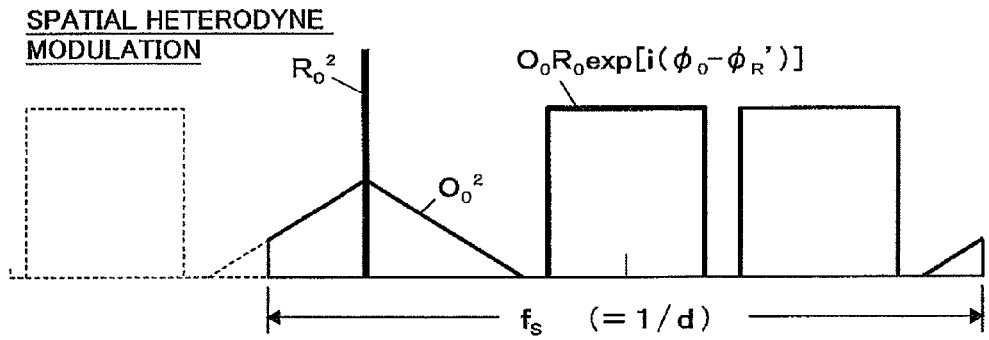
FIG. 9B is a spatial frequency distribution figure in the case where a spatial heterodyne modulation is performed on the hologram of FIG. 9A.
Figure 9C:
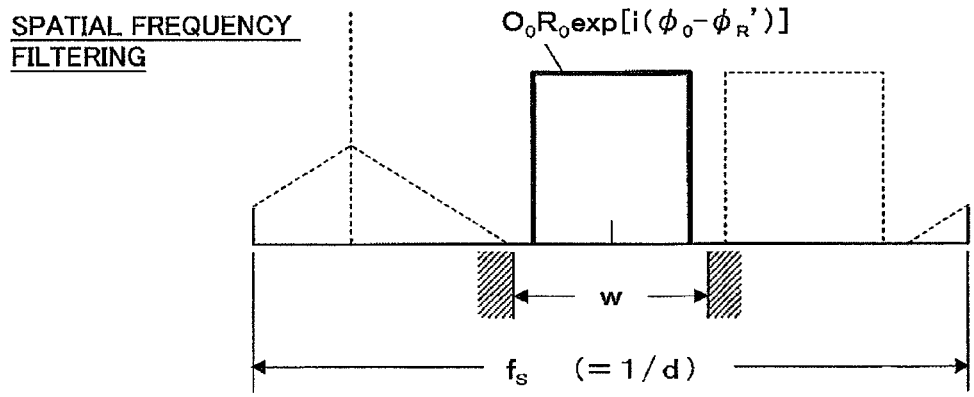
FIG. 9C is a spatial frequency distribution figure in the case where a spatial frequency filtering is performed on the hologram of FIG. 9B.

Next, returning to FIGS. 1A and 2A, the modulation process of a step (S3) is explained. Here, FIGS. 9A, 9B, and 9C are referred to further. FIG. 9A is fundamentally the same as FIGS. 6 and 7A. If the object light O(x, y, t), the off-axis reference light R(x, y, t) for recording, and the in-line reference light R'(x, y, t) for reconstruction each having angular frequency $\omega$ are denoted by the following equations (1), (2), and (3) in a general form on the light receiving surface 51, respectively, the light intensity I(x, y)=|O(x, y, t)+R(x, y, t)|² on the surface of the detector is denoted by equation (4).

$$O(x,y,t) = O_0(x,y) \exp[i(\phi_O(x,y) - \omega t)] \quad (1)$$

$$R(x,y,t) = R_0(x,y) \exp[i(\phi_R(x,y) - \omega t)] \quad (2)$$

$$R'(x,y,t) = R_0'(x,y) \exp[i(\phi_R'(x,y) - \omega t)] \quad (3)$$

$$I(x,y) = O_0^2 + R_0^2 + 2O_0R_0 \cos(\phi_O - \phi_R) \quad (4)$$

The first term in the right hand side of equation (4) shows the light intensity of the object light, the second term shows the light intensity of the reference light, and the third term shows the optical modulation interference fringe pattern which is made by modulating the reference light by the object light. The third term records the amplitude $O_0$ and the phase-angle $\phi_O$ of the object light, and it is considered to be a composition of a direct image component recording a direct image and a conjugate image component recording a conjugate image. Generally, when the light intensity I(x, y) is electronically recorded as an off-axis hologram I, the direct image component and the conjugate image component are separated and recorded in a different spatial frequency band, respectively. For example, the right and left spectral intensity waveform of rectangles in FIG. 9A correspond to the direct image component and the conjugate image component, respectively. Here, as mentioned above, it is assumed that a three-dimensional image is recorded as an off-axis hologram I with a condition that the direct image component and the conjugate image component of the optical modulation interference fringe pattern do not overlap with the component of the light intensity $O_0^2$ of the object light in the spatial frequency domain.

Next, it is supposed that an axis of the in-line reference light R' for reconstruction is the same as that of a image to be reconstructed, and an in-line hologram $I_H$ for the reference light R' is obtained by performing the spatial heterodyne modulation H on the off-axis hologram I. The spatial heterodyne modulation H is performed by multiplying both sides of equation (4) by a factor $\exp[i(\phi_R - \phi_R')]$ which has a difference ($\phi_R - \phi_R'$) between phases of the reference light R and R', thereby, following equation (5) is given.

$$\begin{aligned} I_H &= I \times \exp[i(\phi_R - \phi_R')] \\ &= (O_0^2 + R_0^2)\exp[i(\phi_R - \phi_R')] + \\ &\quad O_0R_0\exp[i(\phi_O - \phi_R')] + O_0R_0\exp[-i(\phi_O - 2\phi_R + \phi_R')] \end{aligned} \quad (5)$$

By the modulation H, the second term and the third term of right hand side of equation (5) are obtained from the optical modulation interference fringe pattern of the third term of right hand side of equation (4). The direct image is reconstructed from the second term of right hand side of equation (5), and a conjugate image is reconstructed from the third term. Then, by performing the spatial frequency filtering on the equation (5), only the second term which records the direct image is separated and extracted, and an exact complex amplitude in-line hologram for image reconstruction can be obtained. Furthermore, the first term and the third term of right hand side of equation (5) contain both phases $\phi_R$, and $\phi_R'$ of the reference light R and R', but the second term contains only the phase $\phi_R'$ of the reference light R'. That is, the second term of the right hand side of equation (5) consists only of the in-line component, and the first and third terms of right hand side contain the off-axis component. The spatial frequency distribution of the modulated hologram $I_H$ becomes a distribution shown in FIG. 9B. The waveform of this FIG. 9B is a waveform made by moving the whole wave of FIG. 9A to left, cutting off the portion that run over the range defined by the spatial sampling frequency $f_S$, and moving the portion to the right edge. FIGS. 9A and 9B show the hologram of multiple components including two or more terms in equation (4) and (5). Moreover, FIG. 9A is symmetrical and corresponds to the real number, and FIG. 9B shows right-and-left asymmetry, and corresponds to the complex number. The waveform part located in the center section of this figure corresponds to the complex amplitude in-line hologram J to be obtained.

Figure 1A:
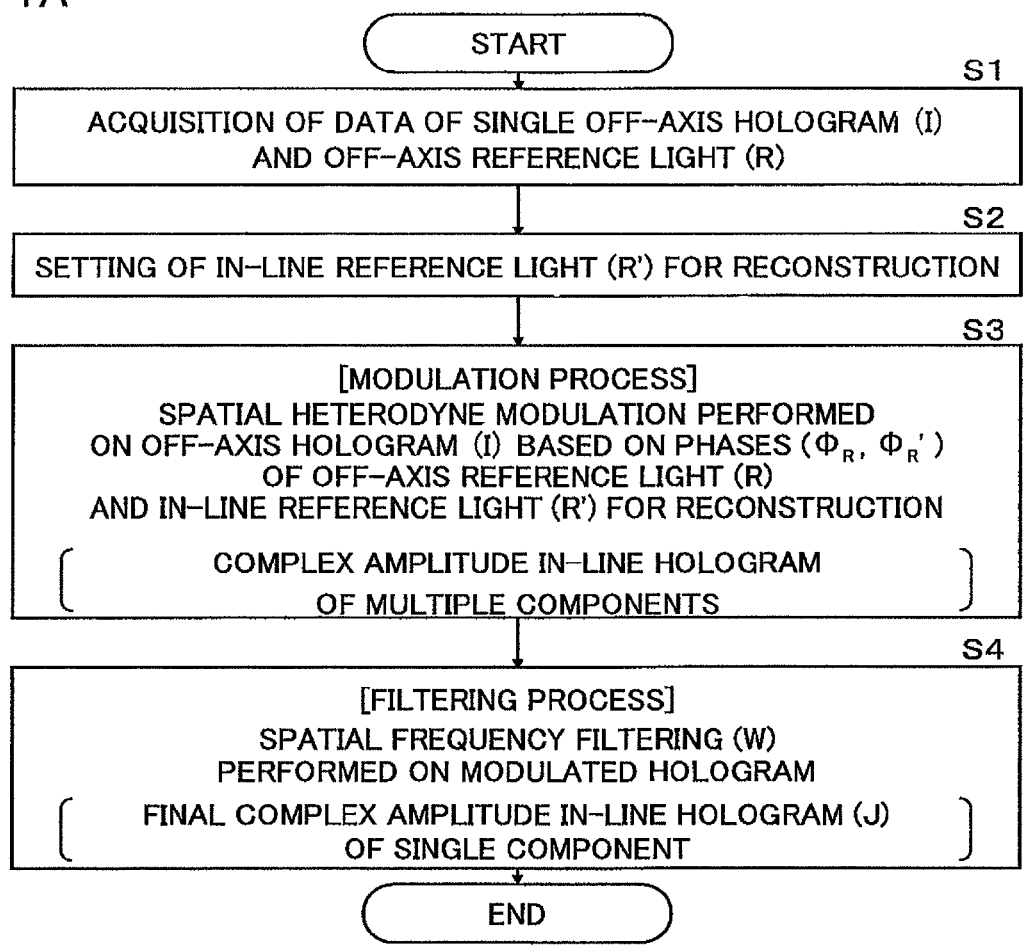
FIG. 1A is a flow chart explaining processing of a generation method of a complex amplitude in-line hologram according to the first embodiment of the present invention.
Figure 2A:
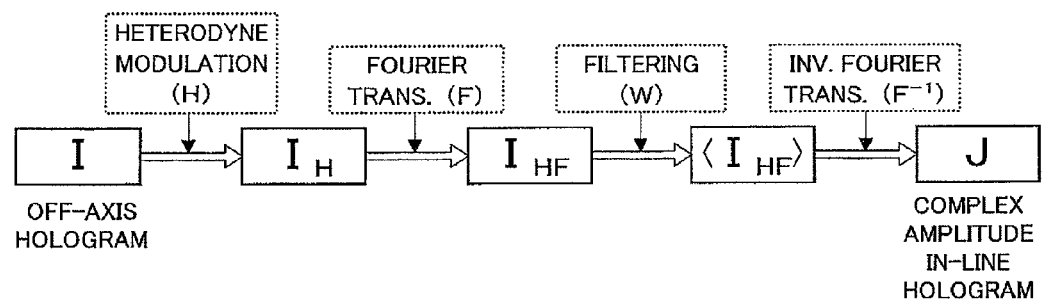
FIG. 2A is a block diagram explaining processing of the method.

The spatial-frequency-filtering W of step (S4) is performed to extract the waveform located in the center section of above-mentioned FIG. 9B. This filtering W is performed as shown in FIG. 2A: by performing fast Fourier transform (FFT) on the hologram $I_H$ to obtain a hologram $I_{HF}$ from it; by doing a filtering process on the hologram $I_{HF}$ to obtain a hologram $<I_{HF}>$ from it with a window w which leaves the center section of the spatial frequency distribution; and by performing fast Fourier transform (inverse transformation) on the hologram $<I_{HF}>$, and then a final complex amplitude in-line hologram J is generated. FIG. 9C shows a spatial frequency distribution of the generated complex amplitude in-line hologram J of one component, and it is of left-right asymmetry and shows complex amplitude if it is observed in detail without approximating (modeling). Since a complex amplitude in-line hologram J records only direct images, the band width of it in the off-axis direction becomes half of that of the optical modulation interference fringe pattern which records direct images and conjugate images.

Figure 2B:
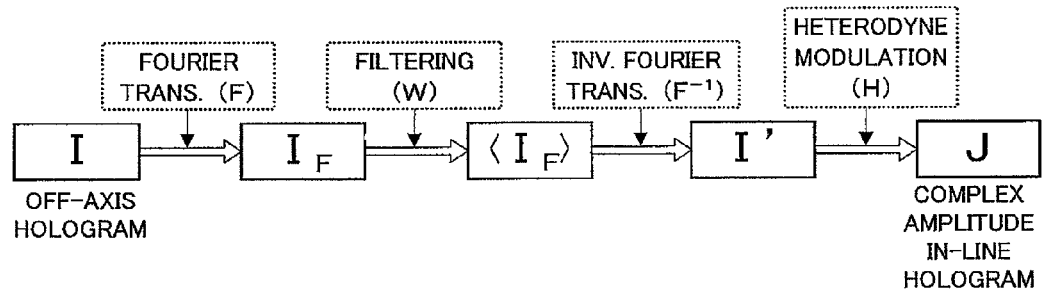
FIG. 2B is a block diagram explaining processing of the modification.

In the above explanation, the spatial frequency filtering (S4) is performed after performing the spatial heterodyne modulation (S3), however, as shown in FIGS. 1B and 2B, the same result is obtained by performing the spatial heterodyne modulation (S14) after the spatial frequency filtering (S13) is performed previously. Namely, the steps (S11) (S12) are the same as the steps (S1) (S2), and the holograms $I_F$, $<I_F>$, and I' are obtained by the Fourier transform, filtering, and inverse Fourier transform, respectively in the step (S13), and a final complex amplitude hologram J of one component is obtained in the step (S14).

According to the first embodiment, since a complex amplitude in-line hologram J is generated from a single off-axis hologram I by the modulation process and the filtering process without performing the spatial sampling and the data interpolation, the complex amplitude in-line hologram J can be generated without restricting the spatial frequency band and therefore without restricting the viewing angle $\psi$, and without including errors of by interpolation. Therefore, the spatial frequency band of the generated hologram J can be extended to the recordable limit defined by the picture element pitch d of the photo detector, and a three-dimensional image of a wide viewing angle can be recorded. Moreover, existing data processing technology can be used for the modulation process and the filtering process; constitution is easy; and high speed processing is possible. Since one monochromatic off-axis hologram I is enough to generate one monochromatic complex amplitude in-line hologram J and the required off-axis hologram I is easily obtained, an image can be recorded in real time. Moreover, it should be noted that the amplitude of reference light and the spatial distribution of phase in equations (1) to (5) are expressed in general form. This means that the reference light R used for obtaining the off-axis hologram I is not restricted to a parallel beam, but more general reference light, for example, a spherical wave etc. can be used. The phase of the reference light is enough if its phase distribution is known, and an arbitrary space phase distribution can be used.

Second Embodiment

Figure 10A:
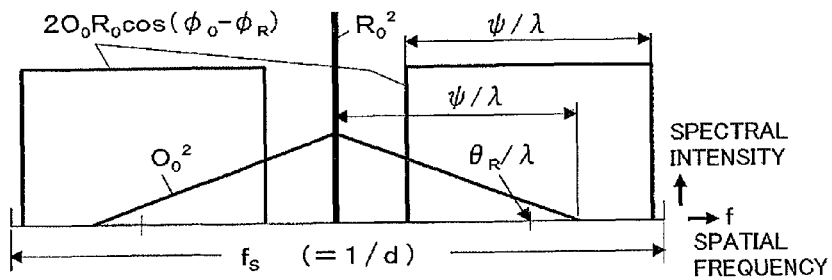
FIGS. 10A and 10B are figures of a spatial frequency distribution of an off-axis hologram to which the generation method of a complex amplitude in-line hologram according to the second embodiment is applied when a viewing angle is large.
Figure 10B:
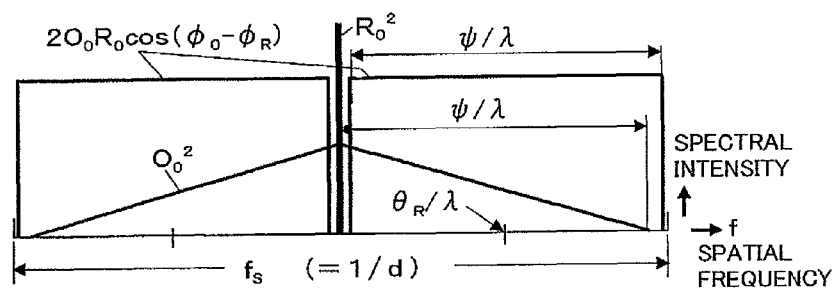
Figure 10C:
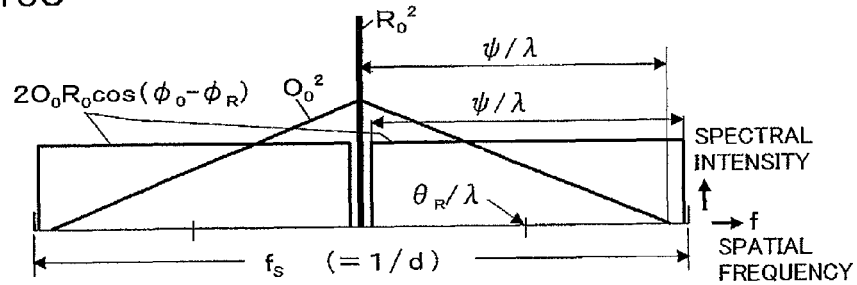
FIG. 10C is a figure of a spatial frequency distribution when application of the method is difficult.
Figure 11:
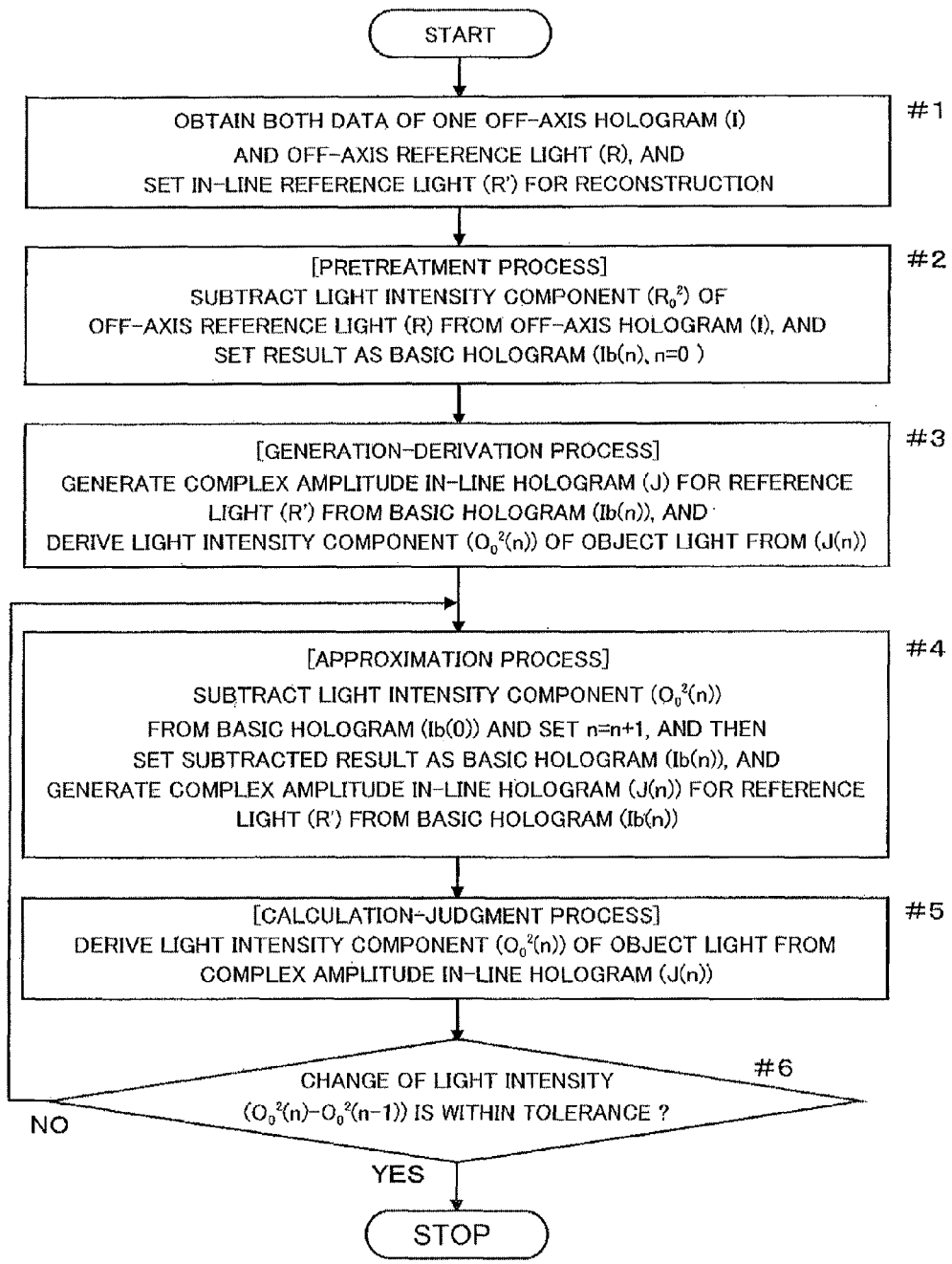
FIG. 11 is a flow chart explaining processing of the method.
Figure 12:
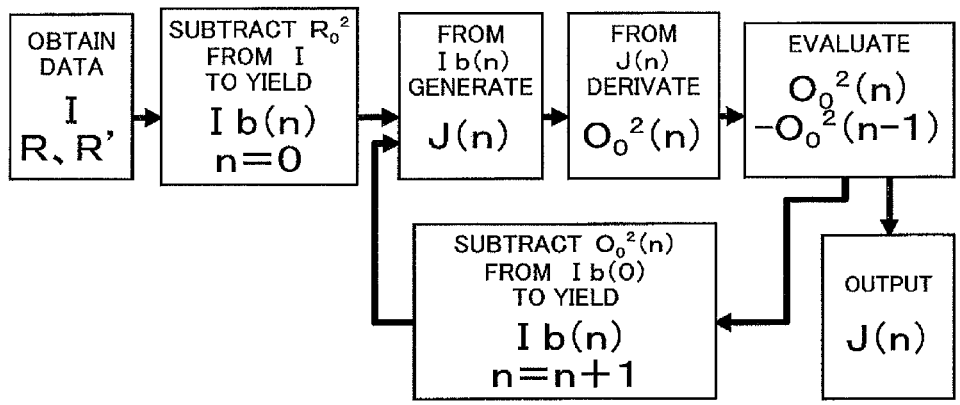
FIG. 12 is a block diagram explaining processing of the method.

FIGS. 10, 11, and 12 show the second embodiment. This embodiment, as shown in FIG. 10, relates to the case that the viewing angle ψ is large and the light intensity $O_0^2$ distribution of the object light O and the light intensity $2O_0R_0 \cos(\phi_O-\phi_R)$ distribution of the optical modulation interference fringe pattern in the spatial frequency distribution are overlapped mutually. As shown in FIGS. 10A and 10B, when the light intensity of the object light O is larger than that of the optical modulation interference fringe pattern, the complex amplitude in-line hologram from which the influence of the object light O is eliminated can be generated with a technique of repetition approximation shown below. As shown in FIG. 10C, when the light intensity of the object light O is smaller than that of the optical modulation interference fringe pattern, it may not be converged by repetition approximation.

As shown in FIGS. 11 and 12, in this generation method, both data of the off-axis hologram I and the reference light R are obtained like the first embodiment, and then setup of the reference light R' is done (#1). Then, a basic hologram $I_b(n)$, n=0, from which the light intensity component of reference light is eliminated, is generated by subtracting the light intensity component $R_0^2$ of the off-axis reference light R from the hologram I (a pretreatment process, #2); a complex amplitude in-line hologram J(n), n=0 for the reference light R' is generated by performing the modulation process (S3 or S14) and the filtering process (S4 or S13), like the first embodiment, on the basic hologram $I_b(n)$, n=0 generated by the pretreatment process; and a light intensity component $O_0^2(n)$, n=0 of the object light is derived using the generated hologram J(n) (a generation-derivation process, #3). Then, a complex amplitude in-line hologram J(n) for the reference light R' is generated by repeating an approximation process (#4) and a calculation judgment process (#5, #6) to eliminate the influence of the object light O.

In the approximation process (#4), the light intensity component $O_0^2(n)$ is subtracted from the basic hologram $I_b(0)$, n=n+1 (increment of an argument) is done, and the subtracted result is made a new basic hologram $I_b(n)$, and further a hologram J(n) is generated from the basic hologram $I_b(n)$. In the next calculation-judgment process (#5, #6), light intensity component $O_0^2(n)$ of the object light is calculated from the hologram J(n) (#5), and it is judged whether the change $O_0^2(n)-O_0^2(n-1)$ of the calculated light intensity component has decreased within a tolerance or not (#6), and if it is not within the tolerance (NO at #6), the processes from the step (#4) are repeated, and if it is within the tolerance (YES at #6), the hologram J(n) at this time is used as a final result, and processing ends.

For the data of light intensity component $R_0^2$ in the above-mentioned pretreatment process (#2), if it is obtained as given data, the given data may be used, and if given data is not available, data obtained as follows may be used; data obtained approximately from hologram I; or data obtained from a functional form of light intensity component $R_0^2$ which is determined using measured sample etc. in the past. Moreover, in the case where the above-mentioned generation method is applied, what is necessary is to perform a hologram obtaining process for obtaining the off-axis hologram I electronically through the photo detector 5 by off-axis holography and a reference light measuring process for obtaining intensity of only the reference light R on a light receiving surface 51 of the photo detector 5 before or after the hologram obtaining process. In this case, the hologram obtaining process is carried out in a condition that the intensity of the reference light R on the light receiving surface 51 is made larger than that of the object light O (refer to FIG. 10). That is, a condition for the above-mentioned repetition approximation calculation to converge certainly is that the light intensity of the object light itself in the first term of the equation (4) is small compared with the optical modulation interference fringe pattern of the third term, and if the first term becomes large, it may not converge. Then, what is necessary for the repetition calculation to converge is to make the amplitude $R_0$ of the reference light larger than the amplitude $O_0$ of the object light when recording holograms.

According to the second embodiment, it is possible to generate the complex amplitude in-line hologram, in which the influence of the light intensity components of the reference light and an object light is decreased, for a three-dimensional image of so large viewing angle that the spatial frequency band width of a direct image component becomes ¼ or more. Moreover, since convergence of approximation is ensured with the off-axis hologram I which is obtained by enlarging the intensity of the reference light R than that of the object light O, it is possible to generate a complex amplitude in-line hologram J by eliminating the influence of the light intensity components of the reference light and the object light more certainly.

Furthermore, even if the optical modulation interference fringe pattern overlaps with the 0-th light (reference light and object light) in a two-dimensional spatial frequency domain and therefore a complex amplitude in-line hologram having no noise cannot be extracted from one off-axis hologram by performing each of the spatial heterodyne modulation and the spatial frequency filtering only once, the influence of the 0-th light can be eliminated and a complex amplitude in-line hologram J of wide band (large viewing angle) can be generated according to this embodiment. Therefore, the spatial frequency bands of the optical modulation interference fringe pattern and the 0-th light can be record in superimposed on each other, and thus it becomes possible to expand each of the maximum frequency band widths of the direct image component to ½ of the spatial sampling frequency $f_S$ in the off-axis direction, and to the spatial sampling frequency $f_S$ in the vertical direction to that.

Third Embodiment

Figure 13:
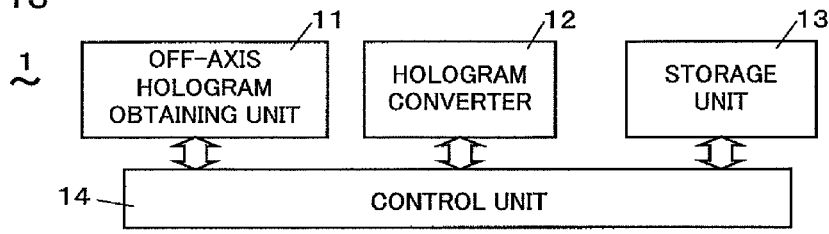
FIG. 13 is a block diagram of an image recording device according to the third embodiment.
Figure 14:
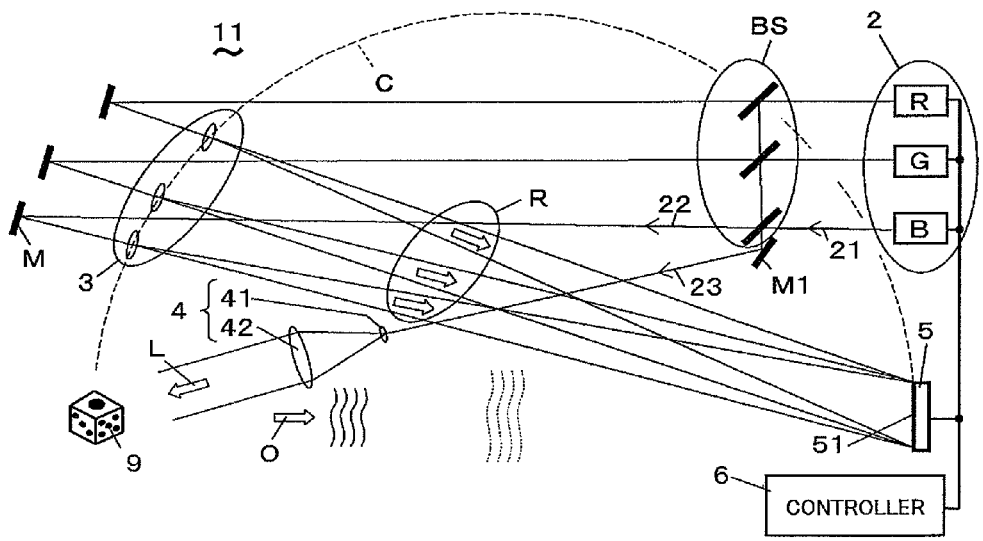
FIG. 14 is a plan view of an off-axis hologram obtaining unit of the device.

FIGS. 13 to 21 show an image recording device of the third embodiment. As shown in FIG. 13, the image recording device 1 comprises an off-axis hologram obtaining unit 11 for recording an object image as an off-axis hologram I by off-axis holography, a hologram converter 12 for generating a complex amplitude in-line hologram from the off-axis hologram I obtained by the off-axis hologram obtaining unit 11, and a storage unit 13 for recording electronically the complex amplitude in-line hologram J generated by the hologram converter 12 as object image information, and a control unit 14 which controls those each part, and the hologram converter 12 uses the generation method for the complex amplitude in-line hologram described above in the first embodiment and the second embodiment. The hologram converter 12, the storage unit 13, and the control unit 14 may be constituted with a general computer and software.

When a monochromatic hologram J is generated and recorded, the hologram obtaining apparatus 11 shown in FIG. 3 can be used as the off-axis hologram obtaining unit 11. And when a color complex amplitude in-line hologram J is generated and recorded, what is necessary is to equip the hologram obtaining part 11 with a plurality of lasers 2 of different wavelength-zone mutually, for example, 3-colors of red, green, and blue; a plurality of lens systems 3 corresponding to each laser; a plurality of beam splitters BS; and a plurality of mirrors M, as shown in FIG. 13. Any of photo detectors for monochrome or colors may be used for the photo detector 5. In recording a color image using a photo detector for monochrome, what is necessary is to perform operation of obtaining the hologram I with one laser 2 plural times by changing the laser 2 one after another. When using a photo detector for colors, the hologram I can be obtained by one time operation by activating plural lasers 2 simultaneously and mixing each the reference lights R and the illumination light L, for example, to white light. A color complex amplitude in-line hologram J can be generated by obtaining an object image as a color off-axis hologram I using the image recording device 1.

Moreover, it is suitable to use a pulsed laser as the laser 2 for the light source of the coherent light in the off-axis hologram obtaining unit 11. Moreover, it is suitable for each reference light R to be a spherical wave made of laser beam using each lens system 3, and to be of constitution made by arranging the position of the center of the spherical wave (light source), the position of a photographic subject (object), and the position of the light receiving surface 51 of the photo detector 5 on the same circumference C. Recording of a hologram of large viewing angle is attained by such arrangement. In addition, in FIG. 14, although each optical system, such as the mirror M and the lens system 3 which constitute the hologram obtaining unit 11, are shown in a broadly distributed situation, each of these optical systems can be constituted in compact, and can be gathered near the photo detector 5. Also in such a case, each reference light R is made to be a spherical wave and the photo detector 5 is irradiated with it, and the light source position of the spherical wave can be set on the same circumference C.

According to the third embodiment, high-speed continuous acquisition of single off-axis holograms is easy, and since generation of complex amplitude in-line holograms can be performed in a post processing, time series images of a changing object or a moving object is easily recordable. Moreover, if complex amplitude in-line holograms are generated at high speed, video of complex amplitude in-line holograms can be generated, recorded, or distributed in real time. By using a pulsed laser as the laser 2 of the image recording device 1, a image can be recorded at higher speed compared with the case where a continuous laser is used, and phenomenon changing at high speed can be recorded. Moreover, using a plurality of lasers as the laser 2 of the image recorder 1, a complex amplitude in-line hologram in color can be generated, and a momentary color image or continuous color images of a moving or changing photographic subject can be recorded. Moreover, since the reference light R and the object light O arrive at the light receiving surface 51 directly and are recorded without passing through any imaging lens as general character of the off-axis holography, image pick-up recording of high-definition color three-dimensional video can be realized without color aberration or distortion.

First Example of the Third Embodiment

For Narrow Viewing Angle

FIGS. 15 and 16 show the first example. A die of edge length 12 mm as a photographic subject with a small viewing angle was put on the position of 50 cm from a photo detector, and a color three-dimensional image was recorded with the image recording device 1. Here, an off-axis hologram I of the die as a stationary object was obtained by one shot recording using a continuous wave laser as the laser 2, and a complex amplitude in-line hologram was generated and recorded. The viewing angle $\psi$ is $\psi=1.2/50=0.024$ rd. Supposing that a picture element pitch d of the photo detector 5 is 4 μm, and a wave length $\lambda$ of the laser beam is 0.47 μm in a short wavelength side of blue, it results that $\lambda/4d=0.0294$. Thus, a recording condition is $\psi<\lambda/4d$, and this means the viewing angle is narrow. For your information, using the picture element pitch d and the wave length $\lambda$, it is expressed $0 \leq \psi \leq \lambda/4d$ for narrow viewing angle $\psi$, and it is expressed $\psi/4d \leq \psi \leq \lambda/2d$ for wide (large) viewing angle $\psi$. The viewing angle of interest is the viewing angle in an off-axis direction (axis-shift direction).

Figure 15A:
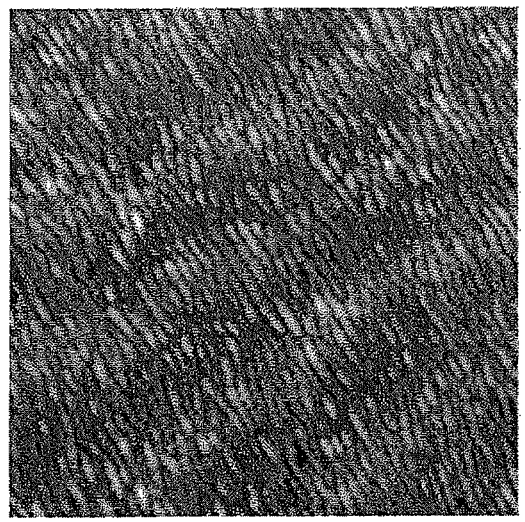
FIG. 15A is a figure showing a part of an off-axis hologram obtained with the device when a viewing angle is narrow.
Figure 15B:
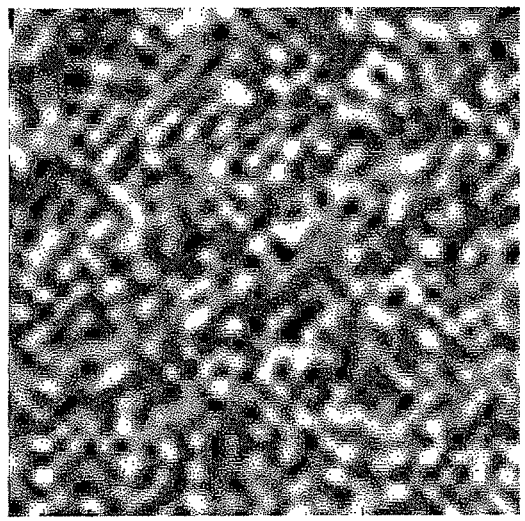
FIG. 15B is a figure showing a part of real part of a complex amplitude in-line hologram generated from the hologram.
Figure 15C:
FIG. 15C is a figure showing a part of imaginary part of the hologram.

FIGS. 15A, 15B, and 15C each shows enlarged view of an interference fringe pattern recorded by the green laser beam, a real number component and an imaginary number component of a complex amplitude in-line hologram J derived from an obtained off-axis hologram I, respectively. The real number component and the imaginary number component of FIGS. 15B and 15C are displayed by 256 gradation after normalization using an effective value of amplitude. The interference fringe pattern shown in FIG. 15A records not only an optical modulation interference fringe pattern made by an object light and a reference light but also an interference fringe pattern (0-th light) made by the object light and the reference light themselves, and the interference fringe pattern of FIG. 15A has lower contrast and higher frequency compared with those of FIGS. 15B and 15C. On the other hand, in the complex amplitude in-line hologram J shown in FIGS. 15B and 15C, a direct image component (optical modulation interference pattern) made by the object light and the reference light is obtained as the interference fringe pattern with higher contrast and lower frequency compared with that of FIG. 15A.

Figure 16A:
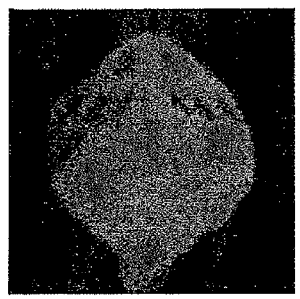
FIGS. 16A, 16B, and 16C are red, green, and blue color image reconstructed from the complex amplitude in-line hologram, respectively.
Figure 16B:
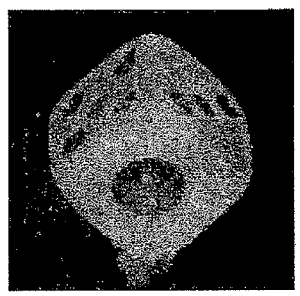
Figure 16C:
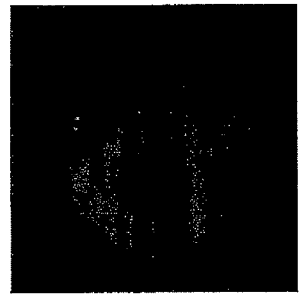
Figure 16D:
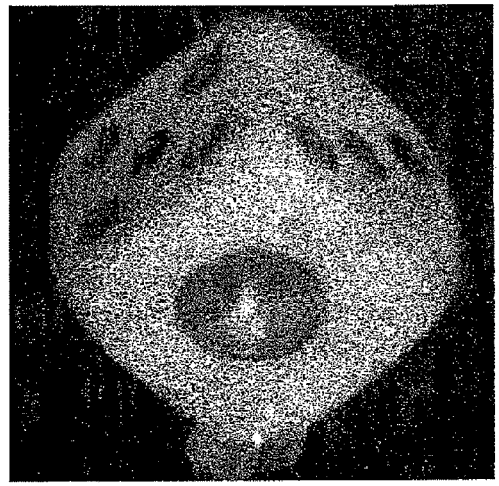
FIG. 16D is the color image reconstructed from the hologram.
Figure 17A:
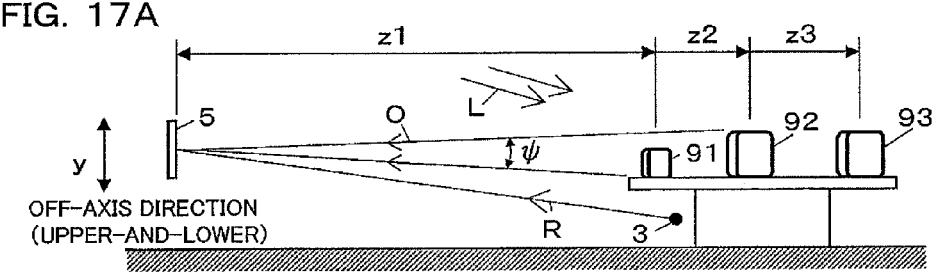
FIG. 17A is a side view showing conditions for obtaining an off-axis hologram with the device in an arrangement in which a viewing angle is large.
Figure 17B:
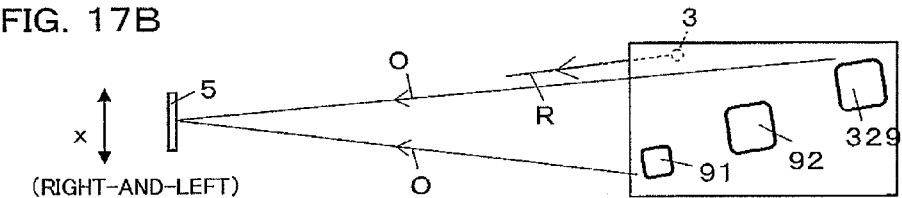
FIG. 17B is a plan view of it.

FIGS. 16A, 16B, and 16C show an image of red, green, and blue of 3-colors reconstructed by numerical computation from the complex amplitude in-line hologram J, respectively. FIG. 16D shows a color image obtained by superimposing the images of 3-colors reconstructed from the complex amplitude in-line hologram J. This color image is a high-definition color image without any color drift. From the result of this image reconstruction, it can be verified that the complex amplitude in-line hologram J of red, green, and blue of 3-colors is recorded correctly.

Second Example of the Third Embodiment

For Wide Viewing Angle

Figure 18:
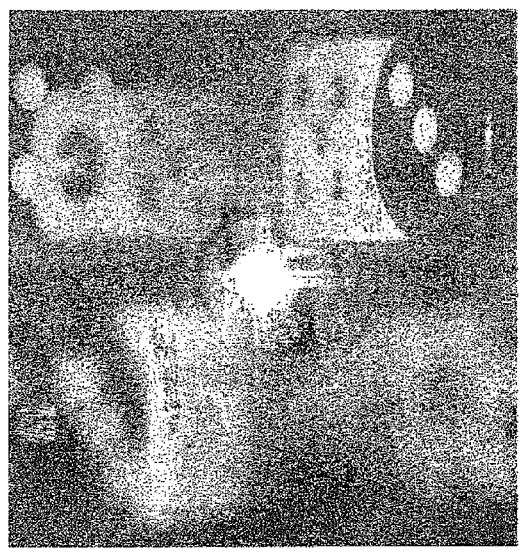
FIG. 18 is a reconstructed image of an off-axis hologram obtained under the above-mentioned arrangement.
Figure 19:
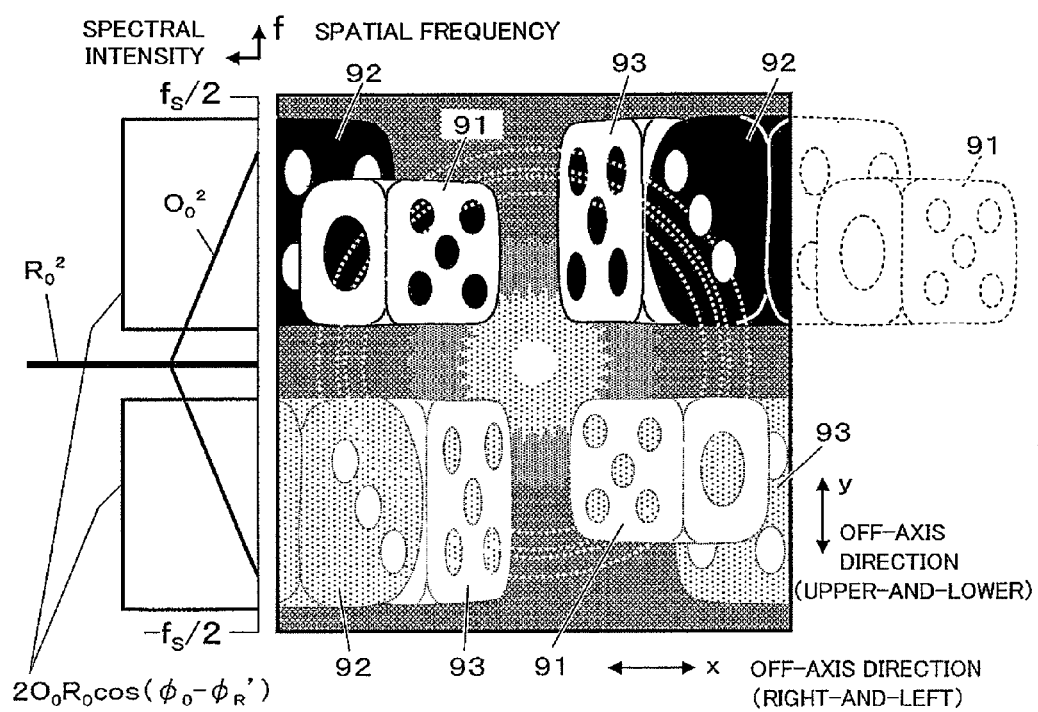
FIG. 19 is a figure explaining the reconstructed image and a spatial frequency distribution related each other.
Figure 20:
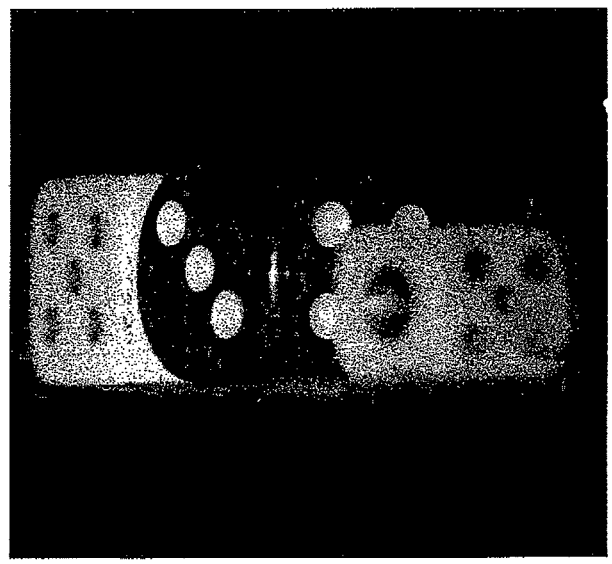
FIG. 20 is a reconstructed image of a complex amplitude in-line hologram generated from the off-axis hologram.
Figure 21:
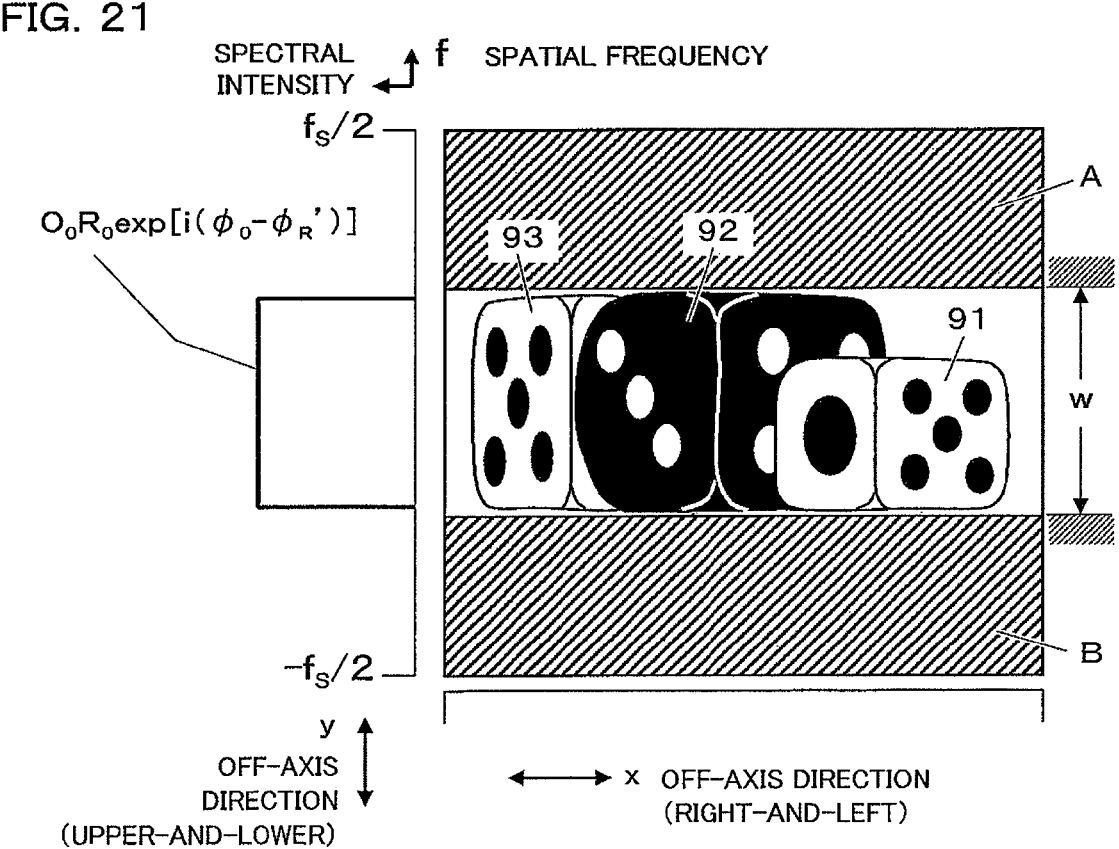
FIG. 21 is a figure explaining the reconstructed image and spatial frequency distribution related each other.

FIGS. 17 to 21 show the second example. As shown in FIGS. 17A and 17B, three dice were shot as a photographic subject of a large viewing angle ψ. A die of edge length 12 mm was put on the position at z1=60 cm from a photo detector, and dice of edge length 18 mm were put on the positions at z2=64 cm and z3=68 cm, respectively, and a light source of a reference light R is arranged in an off-axis position for both directions of upper-and-lower and right-and-left so that a direct image and a conjugate image might not overlap, and an off-axis hologram I was obtained. FIG. 18 shows a monochrome image reconstructed from the off-axis hologram I. FIG. 19 is an explanatory drawing of FIG. 18. As shown in these figures, the direct image and the conjugate image are reconstructed from the off-axis hologram I and separated into the upper half and lower half in the figure, respectively. Moreover, the 0-th light is reconstructed in addition to the direct image and the conjugate image, and image quality of the direct image deteriorates remarkably because of this reconstructed light. FIG. 20 shows a monochrome image reconstructed from a complex amplitude in-line hologram J. Although the direct image in FIG. 19 is reconstructed and separated in the upper right and the upper left, the direct image in FIG. 20 is reconstructed in the center of the figure as a continuous picture by performing the spatial heterodyne modulation. FIG. 21 is an explanatory drawing of FIG. 20. As shown in these figures, a high-definition image with higher contrast is reconstructed from the complex amplitude in-line hologram J, and it turns out from this result that the complex amplitude in-line hologram J is correctly obtained by the image recording device 1.

Moreover, a viewing field shown in FIGS. 18 and 19 expresses a recordable visual field determined from a picture element pitch of a photo detector, and the direct image and the conjugate image are reconstructed in the whole viewing field. As shown in FIGS. 20 and 21, only the direct image is reconstructed from the complex amplitude in-line hologram J, and the visual field becomes narrow in the upper-and-lower direction in response to portions (portions of the domains A and B of FIG. 21) where the conjugate image is separated and eliminated by filtering with a window w in the upper-and-lower direction. The maximum band widths of the complex amplitude in-line hologram J in the upper-and-lower direction and the right-and-left direction are equal to ½ of the spatial sampling frequency $f_S$, and the spatial sampling frequency $f_S$, respectively. These results show that a viewing angle of a three-dimensional image is extended to the theoretically recordable limit with the image recording device 1.

Third Example of the Third Embodiment

Figure 22A:
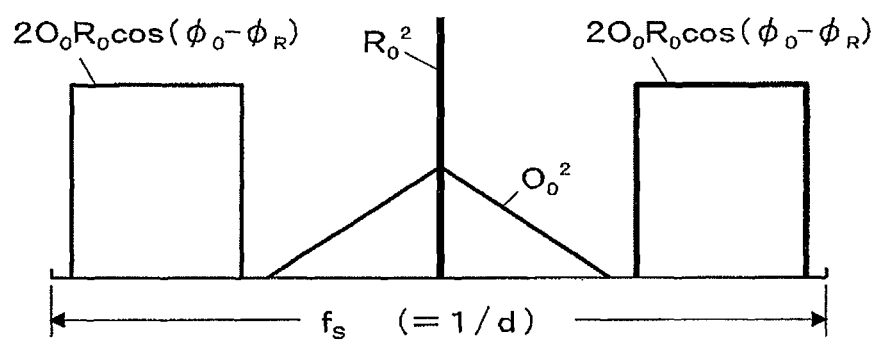
FIG. 22A is a spatial frequency distribution figure of an off-axis hologram when a viewing angle is narrow.
Figure 22B:
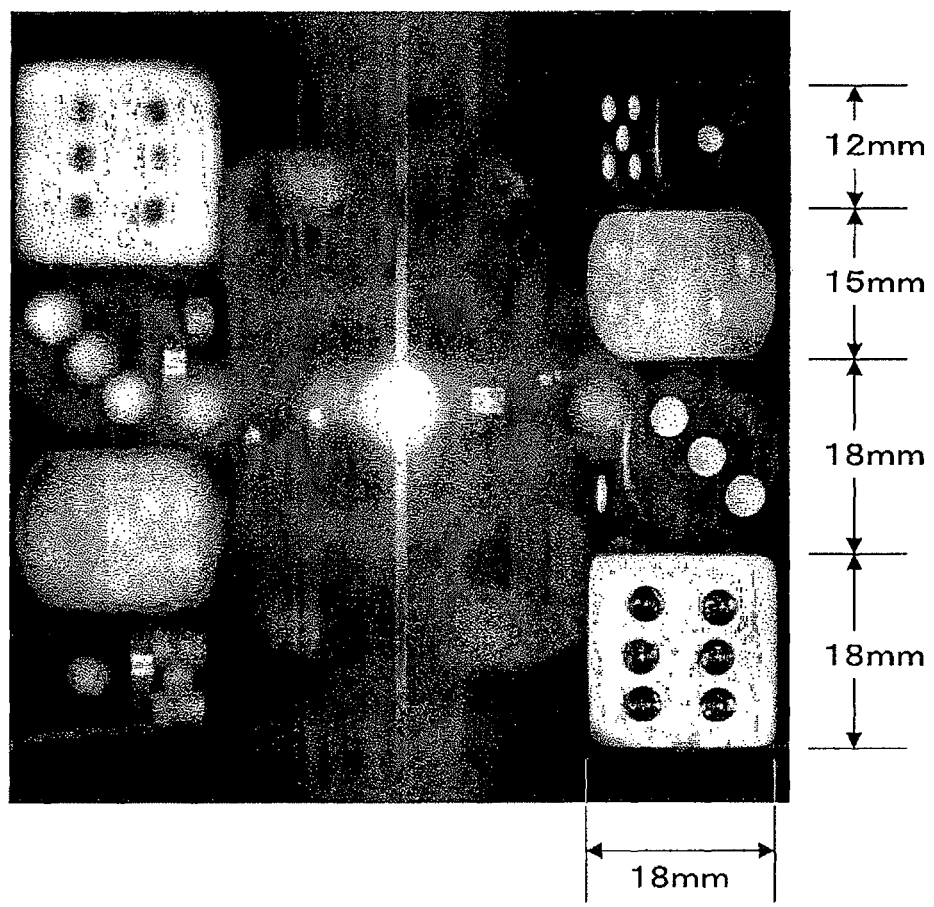
FIG. 22B is a monochrome reconstructed image reconstructed from the hologram.
Figure 23A:
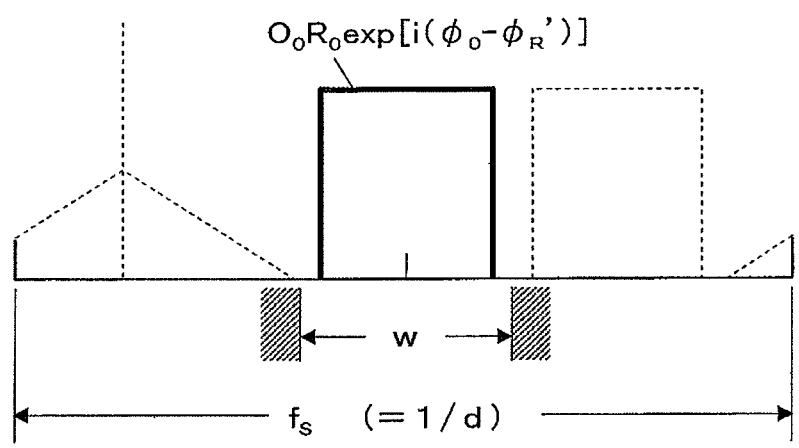
FIG. 23A is a spatial frequency distribution figure of a complex amplitude in-line hologram when a viewing angle is narrow.
Figure 23B:
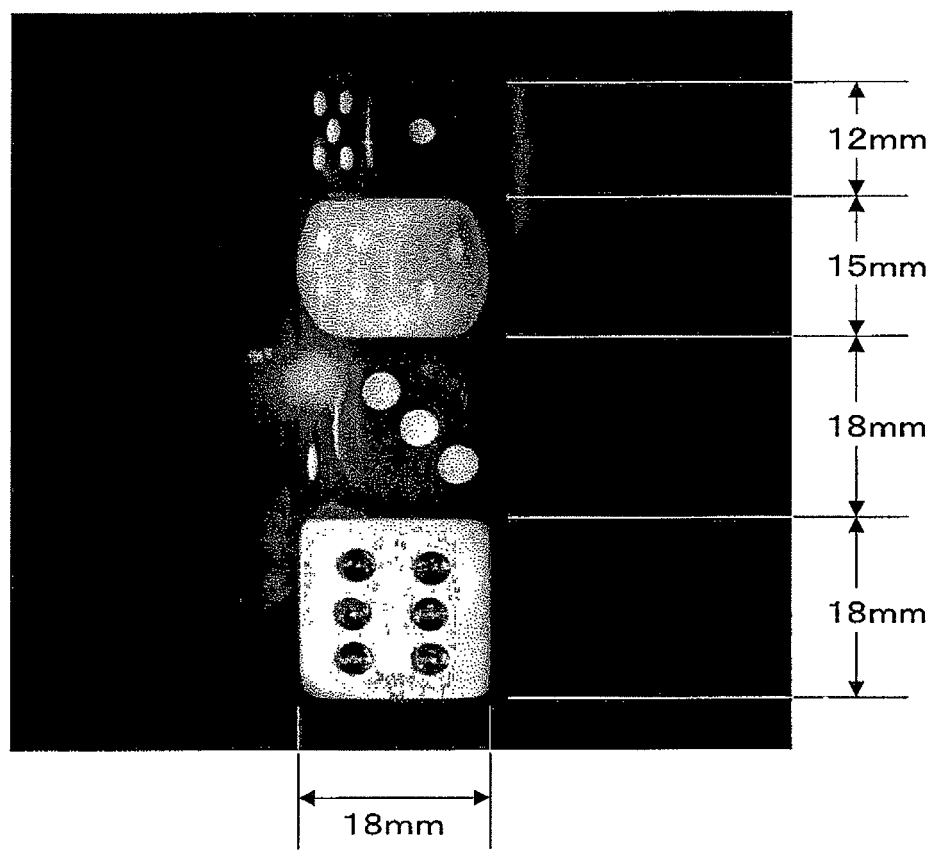
FIG. 23B is a monochrome reconstructed image reconstructed from the hologram.

FIGS. 22 and 23 show the third example. As a photographic subject of a small viewing angle, four dice of edge length 18 mm, 18 mm, 15 mm, and 12 mm, respectively were stacked at a position of 78 cm from a photo detector, and a color three-dimensional image was recorded with the image recording device 1. FIGS. 22A and 22B show a spatial frequency distribution and a reconstructed image based on a recorded off-axis hologram, respectively. A direct image, the 0-th light, and a conjugate image are reconstructed in the right, center, and left of the reconstructed image, respectively, by the off-axis hologram. FIGS. 23A and 23B show a spatial frequency distribution and a reconstructed image based on a complex amplitude in-line hologram generated from the off-axis hologram. Only the direct image is reconstructed in the center of the reconstructed image by the complex amplitude in-line hologram. Moreover, a visual field in the right-and-left direction of the reconstructed image is restricted to ¼ of the whole visual field.

Practical Example of the Second Embodiment

Figure 24:
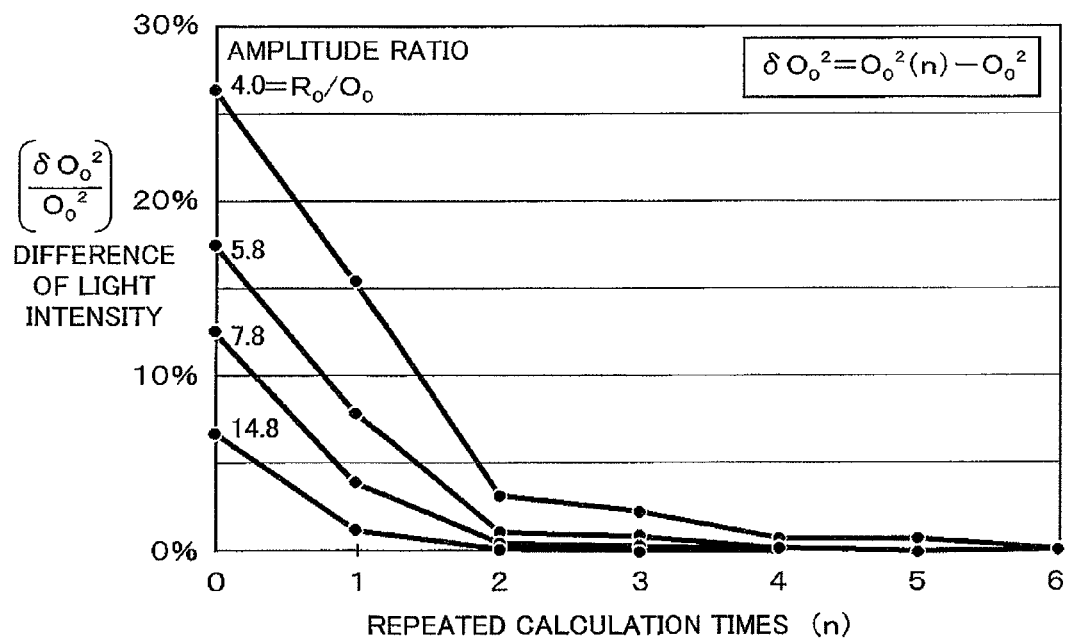
FIG. 24 is a graph showing a situation that a light intensity difference of an object light is converging with calculation times n in a technique of repetition approximation for each of four kinds of amplitude ratio $R_0/O_0$ when a viewing angle is large.

FIG. 24 shows the example of the second embodiment. A complex amplitude in-line hologram for a photographic subject of a large viewing angle can be generated by doing repeated calculations. The convergence of the repetition calculation can be judged based on whether or not light intensity difference $\delta O_0^2 = O_0^2(n) - O_0^2$ of an object light or its normalized value $\delta O_0^2/O_0^2$ becomes small with a repeated calculation times n. Where $O_0^2(n)$ is light intensity calculated from a complex amplitude hologram J (n), and $O_0^2$ is a converged value obtained by the repetition calculation for the object light intensity. It is necessary to set an amplitude ratio $R_0/O_0$ of a reference light and an object light as a larger value than about 3 so that the light intensity $O_0^2(n)$ converges, and if the amplitude ratio $R_0/O_0$ is a value not more than it, the light intensity $O_0^2(n)$ will not converge to a constant value. When such a condition of convergence is fulfilled, as shown in FIG. 24, the speed of convergence is large and light intensity $O_0^2(n)$ converges to a constant value $O_0^2$ by several repetitions. Moreover, the speed of convergence is seldom dependent on the value of the amplitude ratio $R_0/O_0$.

INDUSTRIAL APPLICABILITY

The generation method for a complex amplitude in-line hologram and the image recording device using the same method according to the present invention are applicable to uses of a color three-dimensional image pick-up method and an imaging device, which records three-dimensional images of a moving photographic subject and are used in imaging technique field, information field, medical field, biological science field, design support field, industrial instrumentation field, virtual reality, and so on. This device can carry out recording without using an imaging lens, can record a three-dimensional image of no distortion correctly, and can perform a three-dimensional high-speed image pick-up by using a pulsed laser. Taking these advantages, the present invention is applicable to the measurement of a position or displacement of a moving photographic subject and noncontact and nondestructive high-speed precision measurement of three-dimensional shape. Moreover, the present invention is applicable to a high-speed three-dimensional image pick-up of a phenomenon changing instantaneously, such as a collision and explosion.

In addition, the present invention can be modified variously without being restricted to the above-mentioned constitution. For example, constitutions of each embodiment mentioned above can be combined mutually.

This application is based on the Japan patent application 2010-012425, and the contents should unite to the present application invention as a result by referring to the specification and drawing of the above-mentioned patent application.

EXPLANATIONS OF LETTERS OR NUMERALS

1 Image recording device
11 Off-axis hologram obtaining unit, off-axis hologram obtaining apparatus
12 Hologram converter
13 Storage unit
2 Laser
5 Photo detector
51 Light receiving surface
9 Object (photographic subject)
I Off-axis hologram
Ib, Ib(n) Basic hologram J, J(n) Complex amplitude in-line hologram
O Object light
$O_0$ Amplitude of object light
R Reference light
$R_0$ Amplitude of reference light
R' In-line reference light for reconstruction
$\phi_R$ Phase angle of reference light
$\phi_R'$ Phase angle of in-line reference light for reconstruction
λ Wave length
ψ Viewing angle

The invention claimed is:

1. A generation method for generating a complex amplitude in-line hologram from an off-axis hologram, comprising the steps of:
performing spatial heterodyne modulation on an off-axis hologram obtained by off-axis holography, based on phase of an in-line reference light for reconstruction and phase of an off-axis reference light used for obtaining the off-axis hologram; and
performing spatial frequency filtering on the hologram modulated by the spatial heterodyne modulation, wherein
the method generates the complex amplitude in-line hologram by performing the spatial heterodyne modulation and the spatial frequency filtering in order.

2. A generation method for generating a complex amplitude in-line hologram according to claim 1, characterized in that the method further comprises the steps of:
generating a basic hologram as a pretreatment process by subtracting a light intensity component of the off-axis reference light from the off-axis hologram before performing both the spatial frequency filtering and the spatial heterodyne modulation;
deriving a light intensity component of an object light as a generation-derivation process using a complex amplitude in-line hologram generated by performing the spatial heterodyne modulation and the spatial frequency filtering on the basic hologram generated in the pretreatment process;
generating a complex amplitude in-line hologram as an approximation process by performing the spatial heterodyne modulation and the spatial frequency filtering on an off-axis hologram obtained by subtracting the derived light intensity component of the object light from the basic hologram; and
calculating a light intensity component of the object light using the complex amplitude in-line hologram generated in the approximation process and judging whether or not the light intensity component is within a tolerance, as a calculation-judgment process, wherein
when the light intensity component of the object light is judged not to be within the tolerance in the calculation-judgment process, the method repeats the approximation process and the calculation-judgment process using the light intensity component of the object light in order to eliminate influence of the object light and generate a complex amplitude in-line hologram.

3. A generation method for generating a complex amplitude in-line hologram according to claim 2, characterized in that the method further comprises the steps of:
obtaining the off-axis hologram electronically as an off-axis hologram obtaining process through a photo detector by off-axis holography; and
measuring intensity of the reference light on a light receiving surface of the photo detector before or after the off-axis hologram obtaining process, wherein
the off-axis hologram obtaining process is carried out in a condition that the intensity of the reference light on the light receiving surface being made larger than that of the object light on the light receiving surface.

4. A generation method for generating a complex amplitude in-line hologram according to claim 1, characterized in that the method further comprises the steps of:
reconstructing an image from the off-axis hologram;
detecting a gap between optical axes of the object light and the reference light used for obtaining the off-axis hologram from the reconstructed image; and
setting an optical axis of the in-line reference light for reconstruction by using the gap, as an axis setting process.

5. A generation method for generating a complex amplitude in-line hologram from an off-axis hologram, comprising the steps of:
performing spatial frequency filtering on an off-axis hologram obtained by off-axis holography; and
performing spatial heterodyne modulation on the hologram filtered by the spatial frequency filtering, based on phase of an in-line reference light for reconstruction and phase of an off-axis reference light used for obtaining the off-axis hologram, wherein
the method generates the complex amplitude in-line hologram by performing the spatial frequency filtering and the spatial heterodyne modulation in order.

6. A generation method for generating a complex amplitude in-line hologram according to claim 5, characterized in that the method further comprises the steps of:
generating a basic hologram as a pretreatment process by subtracting a light intensity component of the off-axis reference light from the off-axis hologram before performing both the spatial frequency filtering and the spatial heterodyne modulation;
deriving a light intensity component of an object light as a generation-derivation process using a complex amplitude in-line hologram generated by performing the spatial heterodyne modulation and the spatial frequency filtering on the basic hologram generated in the pretreatment process;
generating a complex amplitude in-line hologram as an approximation process by performing the spatial heterodyne modulation and the spatial frequency filtering on an off-axis hologram obtained by subtracting the derived light intensity component of the object light from the basic hologram; and
calculating a light intensity component of the object light using the complex amplitude in-line hologram generated in the approximation process and judging whether or not the light intensity component is within a tolerance, as a calculation-judgment process, wherein
when the light intensity component of the object light is judged not to be within the tolerance in the calculation-judgment process, the method repeats the approximation process and the calculation-judgment process using the light intensity component of the object light in order to eliminate influence of the object light and generate a complex amplitude in-line hologram.

7. A generation method for generating a complex amplitude in-line hologram according to claim 6, characterized in that the method further comprises the steps of:
obtaining the off-axis hologram electronically as an off-axis hologram obtaining process through a photo detector by off-axis holography; and measuring intensity of the reference light on a light receiving surface of the photo detector before or after the off-axis hologram obtaining process, wherein the off-axis hologram obtaining process is carried out in a condition that the intensity of the reference light on the light receiving surface being made larger than that of the object light on the light receiving surface.

8. A generation method for generating a complex amplitude in-line hologram according to claim 7, characterized in that the method further comprises the steps of:

reconstructing an image from the off-axis hologram;

detecting a gap between optical axes of the object light and the reference light used for obtaining the off-axis hologram from the reconstructed image; and setting an optical axis of the in-line reference light for reconstruction by using the gap, as an axis setting process.

9. A generation method for generating a complex amplitude in-line hologram according to claim 6, characterized in that the method further comprises the steps of:

reconstructing an image from the off-axis hologram;

detecting a gap between optical axes of the object light and the reference light used for obtaining the off-axis hologram from the reconstructed image; and setting an optical axis of the in-line reference light for reconstruction by using the gap, as an axis setting process.

10. A generation method for generating a complex amplitude in-line hologram according to claim 5, characterized in that the method further comprises the steps of:

reconstructing an image from the off-axis hologram;

detecting a gap between optical axes of the object light and the reference light used for obtaining the off-axis hologram from the reconstructed image; and setting an optical axis of the in-line reference light for reconstruction by using the gap, as an axis setting process.

11. An image recording device for generating a complex amplitude in-line hologram from an off-axis hologram which records an object image so as to record the hologram electronically as object image information, comprising:

an off-axis hologram obtaining unit for recording the object image as the off-axis hologram by off-axis holography;

a hologram converter for generating the complex amplitude in-line hologram from the off-axis hologram obtained by the off-axis hologram obtaining unit; and a storage unit for electronically recording the complex amplitude in-line hologram generated by the hologram converter as object image information, wherein the hologram converter includes:

a modulation unit for performing spatial heterodyne modulation on the off-axis hologram, based on phase of an in-line reference light for reconstruction and phase of an off-axis reference light used for obtaining the off-axis hologram; and a filtering unit for performing spatial frequency filtering on the hologram modulated by the modulation unit, and wherein the image recording device generates the complex amplitude in-line hologram using the modulation unit and the filtering unit.

12. An image recording device according to claim 11, wherein the off-axis hologram obtaining unit uses a pulsed laser as a light source of coherent light.

13. An image recording device according to claim 12, wherein the off-axis hologram obtaining unit records an object image as a color off-axis hologram using a plurality of lasers having different wavelength zone each other, and wherein the hologram converter generates a color complex amplitude in-line hologram from the color off-axis hologram.

14. An image recording device according to claim 11, wherein the off-axis hologram obtaining unit records an object image as a color off-axis hologram using a plurality of lasers having different wavelength zone each other, and wherein the hologram converter generates a color complex amplitude in-line hologram from the color off-axis hologram.

15. An image recording device for generating a complex amplitude in-line hologram from an off-axis hologram which records an object image so as to record the hologram electronically as object image information, comprising:

an off-axis hologram obtaining unit for recording the object image as the off-axis hologram by off-axis holography;

a hologram converter for generating the complex amplitude in-line hologram from the off-axis hologram obtained by the off-axis hologram obtaining unit; and a storage unit for electronically recording the complex amplitude in-line hologram generated by the hologram converter as object image information, wherein the hologram converter includes:

a filtering unit for performing spatial frequency filtering on the off-axis hologram; and a modulation unit for performing spatial heterodyne modulation on the hologram filtered by the filtering unit, based on phase of an in-line reference light for reconstruction and phase of an off-axis reference light used for obtaining the off-axis hologram:

the image recording device generates the complex amplitude in-line hologram using the modulation unit and the filtering unit.

16. An image recording device according to claim 15, wherein the off-axis hologram obtaining unit uses a pulsed laser as a light source of coherent light.

17. An image recording device according to claim 16, wherein the off-axis hologram obtaining unit records an object image as a color off-axis hologram using a plurality of lasers having different wavelength zone each other, and wherein the hologram converter generates a color complex amplitude in-line hologram from the color off-axis hologram.

18. An image recording device according to claim 15, wherein the off-axis hologram obtaining unit records an object image as a color off-axis hologram using a plurality of lasers having different wavelength zone each other, and wherein the hologram converter generates a color complex amplitude in-line hologram from the color off-axis hologram.

* * * * *